United States Patent
Malak et al.

(10) Patent No.: US 12,159,106 B2
(45) Date of Patent: Dec. 3, 2024

(54) SYSTEM AND METHOD FOR USE OF TEXT ANALYTICS TO TRANSFORM, ANALYZE, AND VISUALIZE DATA

(71) Applicant: Oracle International Corporation, Redwood Shores, CA (US)

(72) Inventors: Michael Malak, Denver, CO (US); Manisha Gupta, San Ramon, CA (US); Nikhil Surve, San Ramon, CA (US); Chaohui Yu, Fremont, CA (US); Luis E. Rivas, Denver, CO (US); Luis Ramirez, Tlaquepaque (MX); Douglas Savolainen, Highlands Ranch, CO (US)

(73) Assignee: ORACLE INTERNATIONAL CORPORATION

( * ) Notice: Subject to any disclaimer, the term of this patent is extended or adjusted under 35 U.S.C. 154(b) by 398 days.

(21) Appl. No.: 17/408,226

(22) Filed: Aug. 20, 2021

(65) Prior Publication Data
US 2023/0057706 A1 Feb. 23, 2023

(51) Int. Cl.
G06F 40/295 (2020.01)
G06F 40/20 (2020.01)
G06F 40/279 (2020.01)
G06F 40/30 (2020.01)

(52) U.S. Cl.
CPC ............ *G06F 40/20* (2020.01); *G06F 40/30* (2020.01)

(58) Field of Classification Search
None
See application file for complete search history.

(56) References Cited

U.S. PATENT DOCUMENTS

| 10,452,698 | B2 | 10/2019 | Wang | |
|---|---|---|---|---|
| 10,460,035 | B1* | 10/2019 | McNair | G06F 40/30 |
| 10,810,472 | B2 | 10/2020 | Malak | |
| 2009/0055381 | A1* | 2/2009 | Wu | G06F 40/258 |
| | | | | 707/999.005 |
| 2011/0040764 | A1* | 2/2011 | Duchon | G06Q 10/04 |
| | | | | 707/738 |

(Continued)

OTHER PUBLICATIONS

Jones, K, "A statistical interpretation of term specificity and its application in retrieval" Mathematics, Computer Science, Journal of Documentation, Published 2004, 4 pages.

(Continued)

*Primary Examiner* — Seong-Ah A Shin
(74) *Attorney, Agent, or Firm* — TUCKER ELLIS LLP

(57) ABSTRACT

In accordance with an embodiment, described herein is a system and method for use of text analytics to transform, analyze, and visualize data, including support for data flows of unstructured text or other types of textual data input. Additionally described are various examples of algorithmic processes and user interfaces that can be used to enable text analytics in particular environments or use cases. In accordance with an embodiment, the system can be implemented within a cloud environment that enables self-service text analytics. A user, for example an organizational business user who may not be expert in the use of machine learning as applied to data processing, can interact with the system via a user interface, to apply natural language processing or other text analysis techniques to a data flow or set of input data, to generate visualizations or other types of useful information associated with the data.

20 Claims, 19 Drawing Sheets

(56) References Cited

U.S. PATENT DOCUMENTS

| | | | | |
|---|---|---|---|---|
| 2015/0088906 | A1* | 3/2015 | Pal | G06F 16/24578 |
| | | | | 707/749 |
| 2016/0335345 | A1* | 11/2016 | Wang | G06F 16/367 |
| 2017/0270098 | A1* | 9/2017 | Liu | G06F 40/186 |
| 2018/0276201 | A1* | 9/2018 | Choi | G06N 3/084 |
| 2019/0362021 | A1* | 11/2019 | Balduino | G06Q 30/01 |
| 2020/0394455 | A1 | 12/2020 | Lee | |
| 2021/0157858 | A1* | 5/2021 | Stevens | G06F 40/279 |
| 2021/0256534 | A1* | 8/2021 | An | G06N 3/08 |
| 2021/0406771 | A1* | 12/2021 | Basak | G06F 40/123 |
| 2022/0092443 | A1* | 3/2022 | Seyot | G06F 40/295 |

OTHER PUBLICATIONS

Date, Edgar et al., "A Formula for Predicting Readability: Instructions" Educational Research Bulletin vol. 27, No. 2, Feb. 18, 1948, ©1948 Taylor & Francis, Ltd., 2 pages.

Blei, David M et al., "Latent Dirichlet Allocation" Journal of Machine Learning Research 3 (2003), ©2003, 993-1022.

Kapadia, Shashank, "Evaluate Topic Models: Latent Dirichlet Allocation (LDA) A step-by-step guide to building Interpretable topic models", Aug. 19, 20219, 19 pages, retrieved from: <https://towardsdatascience.com/evaluate-topic-model-in-python-latent-dirichlet-allocation-lda-7d57484bb5d0> on Jul. 14, 2021.

Unknown, "Machine Learning in Python" Getting Started, Release Highlights for 0.24, GitHub, 2021, 4 pages retrieved from: <https://scikit-learn.org/stable/> on Jul. 14, 2021.

Jones, Anna Bianca, "Sentiment analysis on reviews: Feature Extraction and Logistic Regression", Dec. 2, 2018, 19 pages, retrieved from: <https://medium.com/@annabiancajones/sentiment-analysis-on-reviews-feature-extraction-and-logistic-regression-43a29635cc81> on Jul. 14, 2021.

Unknown, "sklearn.feature extraction.text", ©2007-2020, scikit-learn developers, 7 pages, retrieved from: < https://scikit learn.org/stable/modules/generated/sklearn.feature_extraction.text.CountVectorizer.html> on Jul. 14, 2021.

Wang, Xuerui et al., "Topical N-Grams: Phrase and Topic Discovery, with an Application to Information Retrieval", CDM '07: Proceedings of the 2007 Seventh IEEE International Conference on Data Mining, Oct. 2007, pp. 697-702.

Walker, Strother H. et al., "Estimation of the Probability of an Event as a Function of Several Independent Variables", Biometrika, vol. 54, No. 1/2 (Jun. 1967), pp. 167-179, Published by Oxford University Press on Behalf of Biometrika Trust.

European Patent Office, International Searching Authority, Notification of Transmittal of the International Search Report and the Written Opinion of the International Searching Authority, or the Declaration dated Sep. 19, 2022 for International Application No. PCT/US2022/031083 , 13 pages.

European Patent Office, Notification Concerning Transmittal of International Preliminary Report on Patentability dated Feb. 29, 2024 for International Patent Application No. PCT/US2022/31083 , 10 pages.

* cited by examiner

SYSTEM AND METHOD FOR USE OF TEXT ANALYTICS TO TRANSFORM, ANALYZE, AND VISUALIZE DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally directed to systems and methods for processing a data flow or set of input data, and the use of text analytics to transform, analyze, and visualize data, including support for data flows of unstructured text or other types of textual data.

BACKGROUND

Generally described, data analytics enables computer-based analytical examination of typically large amounts of input data, in order to derive additional useful information from that data. For example, within a business organization, a range of business intelligence (BI) tools can be used to provide business users with information describing organizational data in a presentation format that assists those users in making strategic business decisions. Data analytics can also be applied to other environments, such as science and engineering, media communications, ecommerce, or online search applications.

During the past several years, the use of business intelligence and other forms of data analytics has expanded beyond the analysis of relatively-straightforward numeric or text-category-label types of data. Nowadays, much of the data that is of interest to a particular organization arrives in the form of unstructured text or other data, such as, for example, e-mails, text messages, responses to online surveys, or other types of free-form or unstructured text.

The use of text analytics can be applied to such types of data, in order to better understand and make use of the data. However, typical approaches to the use of text analytics generally require the user to be adept in applying techniques such as computer-based natural language processing, which can hinder accessibility by business or everyday users.

SUMMARY

In accordance with an embodiment, described herein is a system and method for use of text analytics to transform, analyze, and visualize data, including support for data flows of unstructured text or other types of textual data input.

Additionally described are various examples of algorithmic processes and user interfaces that can be used to enable text analytics in particular environments or use cases.

In accordance with an embodiment, the system can be implemented within a cloud environment that enables self-service text analytics. A user, for example an organizational business user who may not be expert in the use of machine learning as applied to data processing, can interact with the system via a user interface, to apply natural language processing or other text analysis techniques to a data flow or set of input data, to generate visualizations or other types of useful information associated with the data.

DETAILED DESCRIPTION

As described above, nowadays much of the data that is of interest to a particular organization arrives in the form of unstructured data, such as, for example, e-mails, text messages, responses to online surveys, or other types of free-form or unstructured text. However, the typical approach to using text analytics with such data necessitates the user to be particularly adept in applying techniques such as computer-based natural language processing (NLP), which in turn hinders accessibility by business or everyday users to such features In accordance with an embodiment, described herein is a system and method for use of text analytics to transform, analyze, and visualize data, including support for data flows of unstructured text or other types of textual data input.

Additionally described are various examples of algorithmic processes and user interfaces, that can be used to enable text analytics in particular environments or use cases.

For example, in accordance with various embodiments, the system can apply one or more algorithmic processes that perform Latent Dirichlet Allocation (LDA) clustering, term frequency-inverse document frequency (TF-IDF) based sentiment analysis, and/or an assessment of reading grade level as a machine learning (ML) feature, to control or supplement the application of text analytics to a particular data flow or set of input data.

In accordance with an embodiment, the system can be implemented within a cloud environment that enables self-service text analytics. A user, for example an organizational business user who may not be expert in the use of machine learning as applied to data processing, can interact with the system via a user interface, to apply natural language processing or other text analysis techniques to a data flow or set of input data, to generate visualizations or other types of useful information associated with the data.

In accordance with various embodiments, examples of the types of free-form or unstructured textual data that can be received as input and examined using the systems and methods described herein include e-mail messages, text (e.g., SMS) messages, textual responses to online surveys, tweets, transcripts of customer service representative chats, medical transcription notes, online product/movie reviews, comments provided within a human capital management (HCM), human resources (HR), or enterprise resource planning (ERP) system, Slack chats, scraped web pages, song lyrics, or ecommerce product descriptions.

The above examples of various types of free-form or unstructured textual data are provided by way of example and for purposes of illustration; in accordance with various embodiments, the systems and methods described herein can be similarly used to apply text analytics to transform, analyze, and visualize other types of data flows of unstructured text or other types of textual data.

Data Analytics Environments

Figure 1:
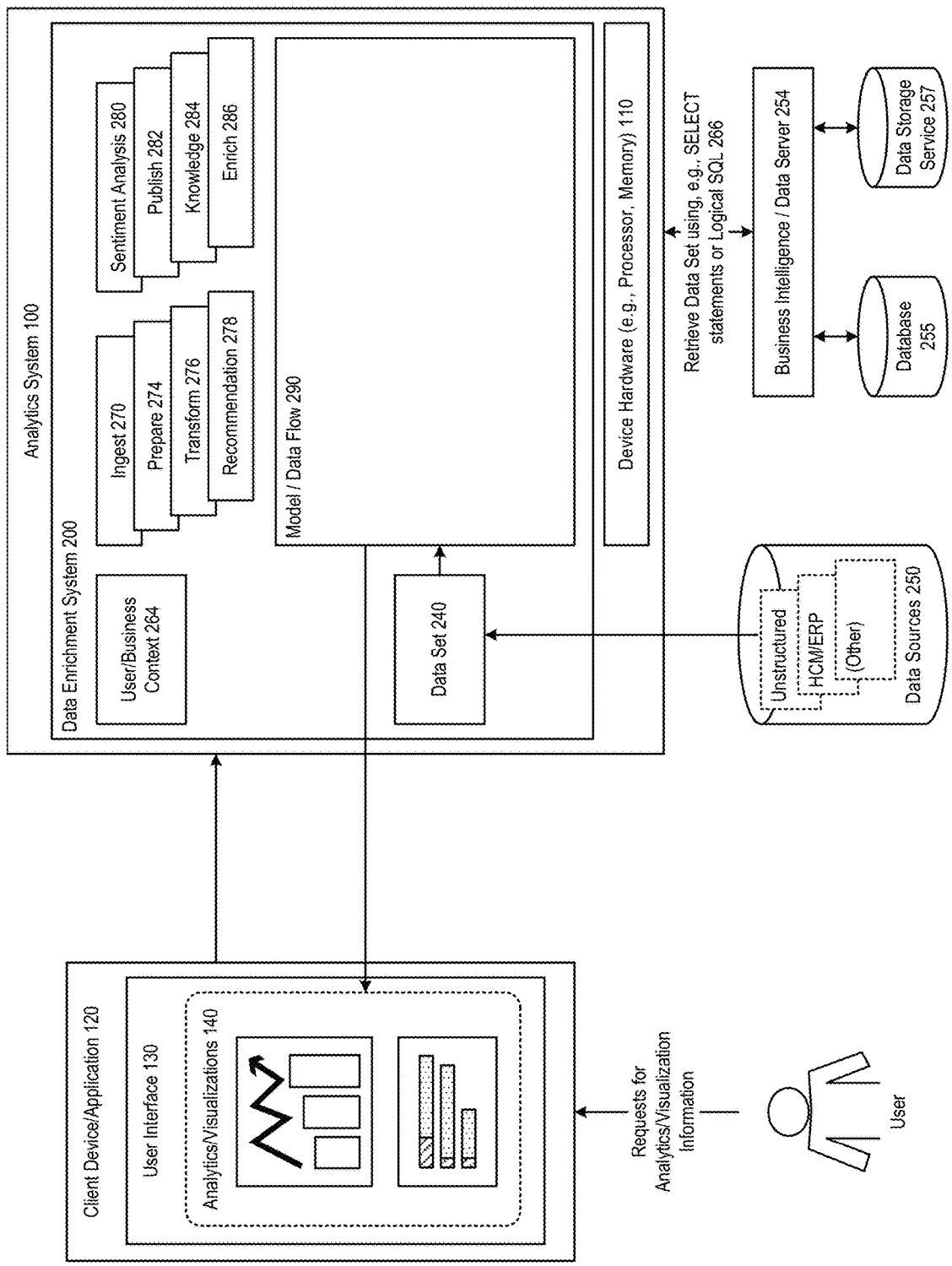
FIG. 1 illustrates a system for use of text analytics to transform, analyze, or visualize data, in accordance with an embodiment.

FIG. 1 illustrates a system for use of text analytics to transform, analyze, or visualize data, in accordance with an embodiment.

The embodiment illustrated in FIG. 1 is provided for purposes of illustrating an example of a computing environment that enables the use of text analytics to transform, analyze, and visualize other types of data flows of unstructured text or other types of textual data. In accordance with various embodiments, the various components, processes, and features described and illustrated herein can be used with other types of data analytics systems or computing environments.

In accordance with various embodiment, the components, processes, and features illustrated in the drawings and further described herein, can be provided as software or program code executable by a computer system or other type of processing device ore computing environment, including in some embodiments a cloud-based computing environment (cloud environment), such as, for example, an Oracle Analytics Cloud (OAC) environment.

As illustrated in FIG. 1, in accordance with an embodiment, a data analytics system 100 can include a device hardware 110 (e.g., processor, memory), and provide a data enrichment system 200 that enables access by client devices/applications 120 to access and transform, analyze, or visualize data provided by the analytics system.

For example, in accordance with an embodiment, the analytics system can be provided as a cloud environment such as OAC that provides access to client devices/applications via a cloud service, such as, for example, Oracle Analytics Cloud Service.

In accordance with other embodiments, the analytics system can be provided by or in association with other types of computing environments, including for example other types of cloud environments or on-premise (e.g., non-cloud) based computing environments.

In accordance with an embodiment, a client application can be implemented as software or computer-readable program code executable by a computer system or processing device, and having a user interface 130, such as, for example, a software application user interface or a web browser interface. The client application can retrieve or access data via an Internet/HTTP or other type of network connection to the analytics system, or in the example of a cloud environment via a cloud service provided by the environment.

In accordance with an embodiment, the user interface can include or provide access to various data flow action types, as described in further detail below, that enable self-service text analytics, including allowing a user to display a data set, or interact with the user interface to transform, analyze, or visualize the data, for example to generate graphs, charts, or other types of data analytics or visualizations 140 data flows associated with unstructured text or other types of textual data.

In accordance with an embodiment, the analytics system enables a data set 240 to be retrieved, received, or prepared from one or more data source(s) 250, for example via one or more data source connections.

As described above, examples of the types of data that can be transformed, analyzed, or visualized using the systems and methods described herein include HCM, HR, or ERP data, e-mail or text messages, or other of free-form or unstructured textual data.

For example, in accordance with an embodiment that enables intelligence (BI) tools for use with organizational data, data can be retrieved, received, or prepared via a business intelligence server 254 in communication with one or more of a database 255, data storage service 257, or other type of data repository or data source.

In accordance with an embodiment, a request 142 for data analytics or visualization information can be received via a client application and user interface as described above, and communicated to the analytics system (in the example of a cloud environment, via a cloud service).

The system can create a user/business context 264 associated with the request, and retrieve an appropriate data set to address the user/business context 265, for use in generating and returning 144 the requested data analytics or visualization information to the client. For example, in accordance with an embodiment, the data analytics system can retrieve a data set using, e.g., SELECT statements or Logical SQL 266 instructions.

In accordance with an embodiment, the system can create a model or data flow 290 that reflects an understanding of the data flow or set of input data, by applying various algorithmic processes, including as further described herein applying one or more natural language processing or other text analysis techniques to the data flow or set of input data, to generate visualizations or other types of useful information associated with the data.

In accordance with an embodiment, the data enrichment system can additionally include various components, processes, or features such as, for example, an ingest server 270, prepare server 274, transform server 276, recommendation server 278, sentiment analysis server 280, publish server 282, knowledge server 284, and enrich server 286; some or all of which can be used in various combinations by the system to further transform, analyze, or visualize the data.

For example, in accordance with an embodiment, the data sources can be sampled by the ingest server, and the sampled data analyzed for enrichment. Identified data can be received and added to a distributed storage system, such as for example, a Hadoop Distributed Storage (HDFS) accessible to the data enrichment server. The data may be processed semantically by a pipeline having a number of processing stages.

For example, such processing stages can include one or more preparation stages controlled by the prepare server, publishing stages controlled by the publish server, and/or enrich stages controlled by the enrich server.

In accordance with an embodiment, a preparation stage can be adapted to automatically detect a data source format and perform an appropriate content extraction. Once the data source format is identified, the data source can be automatically prepared or normalized into a format that can be processed by the enrich server.

In accordance with an embodiment, inbound data sources can be loaded to a distributed storage system coupled to the enrich server, which provides a temporary storage space for ingested data files, intermediate processing files, and storage of results prior to publication. Enhanced or enriched results can also be stored in the distributed storage system; together with any metadata captured during the enrichment process and associated with the ingested data.

In accordance with an embodiment, the data enrichment system can provide sentiment analysis through the sentiment analysis server, which includes functionality for analyzing the sentiment of a data from different data sources.

In accordance with an embodiment, the publish server can provide data source metadata captured during enrichment to one or more visualization systems for analysis (e.g., to display recommended data transformations, enrichments, and/or other modifications). The publish server can deliver the processed data to one or more data targets, such as, for example, another computing system, database, or service.

In accordance with an embodiment, the data can be enriched to include additional content, such as for example a related information for unknown words or neologisms.

As indicated above, in accordance with various embodiments, the components, processes, and features illustrated in the drawings and described herein, can be provided as software or program code executable by a computer system or other type of processing device ore computing environment, including in some embodiments a cloud environment such as OAC.

For example, in accordance with an embodiment, the data enrichment system, and the various components, processes, and features thereof, may be implemented in software (e.g., program code or instructions executable by one or more processor or compute devices provided within a cloud environment. In accordance with various embodiments, data may be stored using one or more data structures that are organized in a variety of ways depending on how, what, and/or where data is stored, and are stored within data storage components of the cloud environment.

Figure 2:
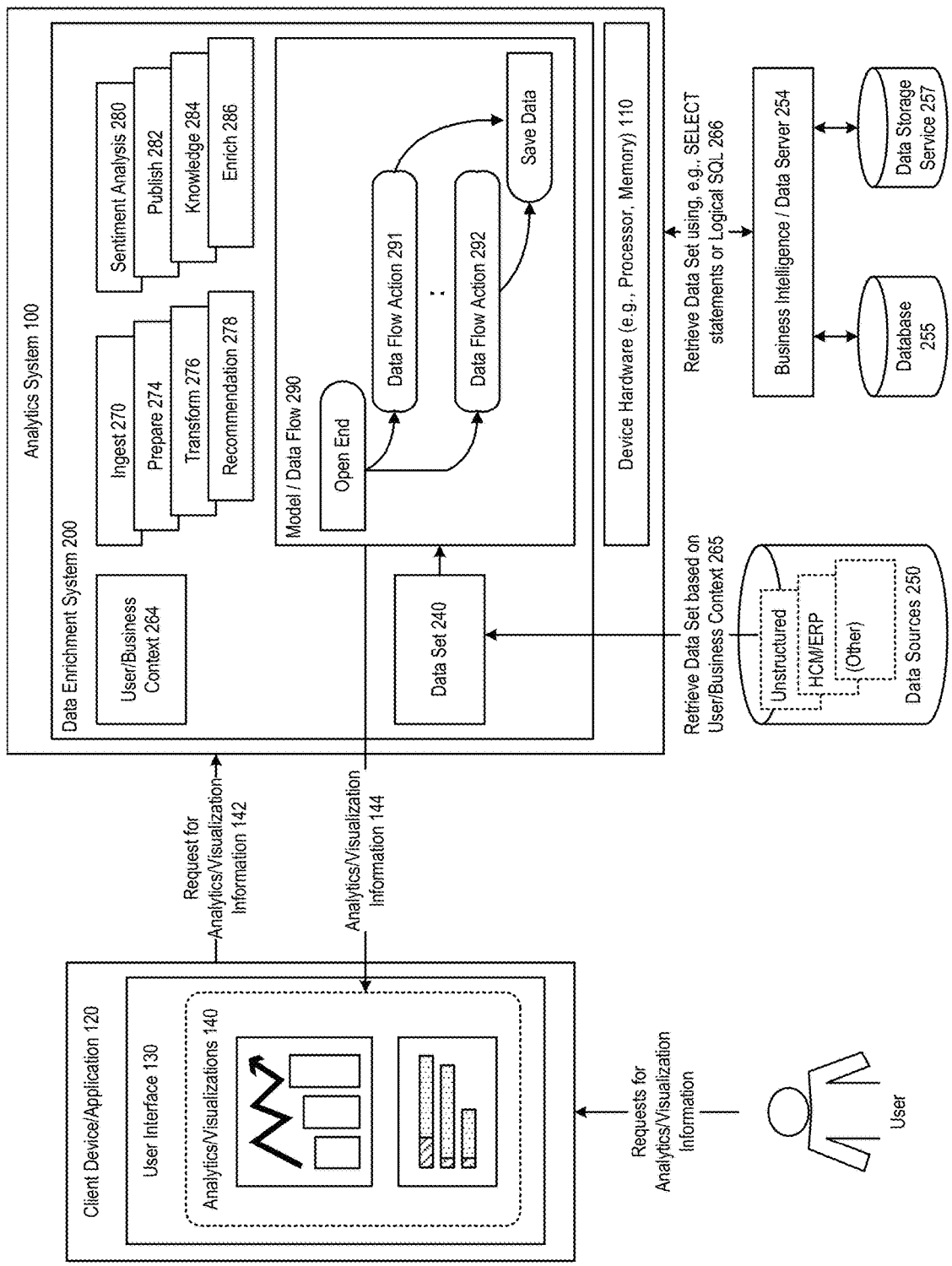
FIG. 2 further illustrates a system for use of text analytics to transform, analyze, or visualize data, in accordance with an embodiment.
Figure 3:
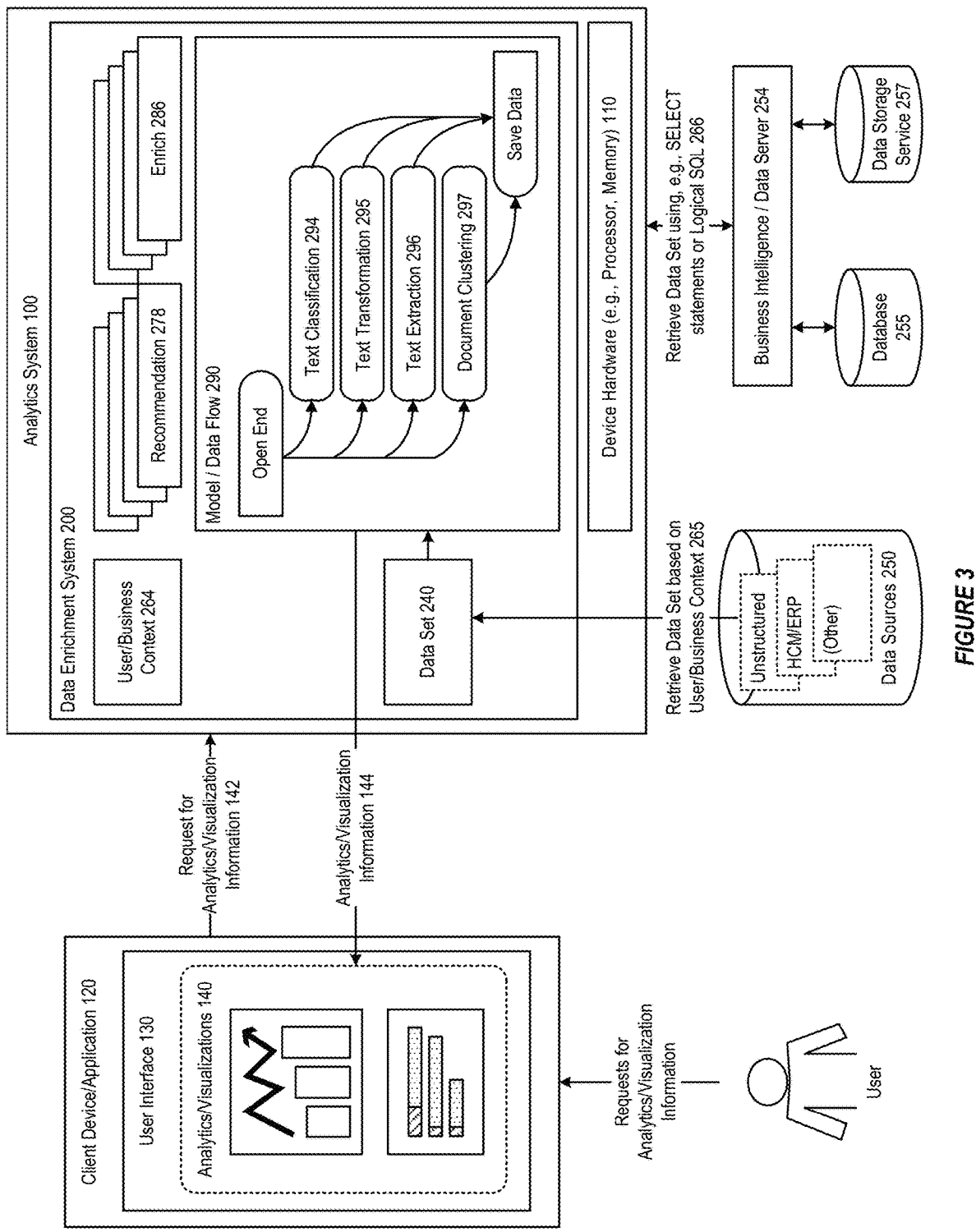
FIG. 3 further illustrates a system for use of text analytics to transform, analyze, or visualize data, in accordance with an embodiment.

FIGS. 2-3 further illustrate a system for use of text analytics to transform, analyze, or visualize data, in accordance with an embodiment.

As described above, in accordance with an embodiment, the system can create a model or data flow that reflects an understanding of the data flow or set of input data.

As illustrated in FIG. 2, in accordance with an embodiment, the model or data flow can be further modified by applying appropriate various natural language processing or other text analysis techniques to the data flow or set of input data, including for example one or more data flow actions 291, 292, that operate on the data flow or set of input data.

For example, as illustrated in FIG. 3, in accordance with an embodiment, the system can be adapted to apply one or more text classification 294, text transformation 295, text extraction 296, or document clustering 297 data flow actions that operate on the data flow or set of input data.

As further described below, in accordance with an embodiment, a user can interact with the system via a user interface, to control the use of data flow actions to apply natural language processing or other text analysis techniques to the data flow or set of input data, to generate visualizations or other types of useful information associated with the data.

Automatic Naming of Topics Determined by LDA Clustering

In accordance with various embodiments, the system can apply one or more algorithmic processes that perform Latent Dirichlet Allocation (LDA) clustering to control or supplement the application of text analytics to a particular data flow or set of input data.

Generally described, an LDA algorithm or process can be used to generate a model that allows observations of various data within a data set based on determining similarities within the data. For example, as applied to data flows or documents of unstructured text or other types of textual data, LDA can be used to characterize or associate the documents with topics—generally words or phrases of multiple words—such that the word/phrase presence within a data set is attributable to one of those topics.

However, although LDA can be used to cluster an input data flow or set of documents into topics, the typical LDA approach does not, for example yield labels or names for those topics.

In accordance with an embodiment, the system can apply an LDA process that performs automatic naming of topics associated with a data flow or set of input data, using an approach generally of: generating a plurality of multi-word topics or n-grams (e.g., bigrams or two-word topic titles, and trigrams or three-word topic titles), treating each generated title as if it were an entire document, and using a scoring process to determine, for a which particular title has the greatest probability of being associated with a particular topic. Given a particular document, the system can return a probability for that document as belonging to each of N topics.

FIGS. 4-8 further illustrates a system for use of text analytics to transform, analyze, or visualize data, in accordance with an embodiment.

Figure 4:
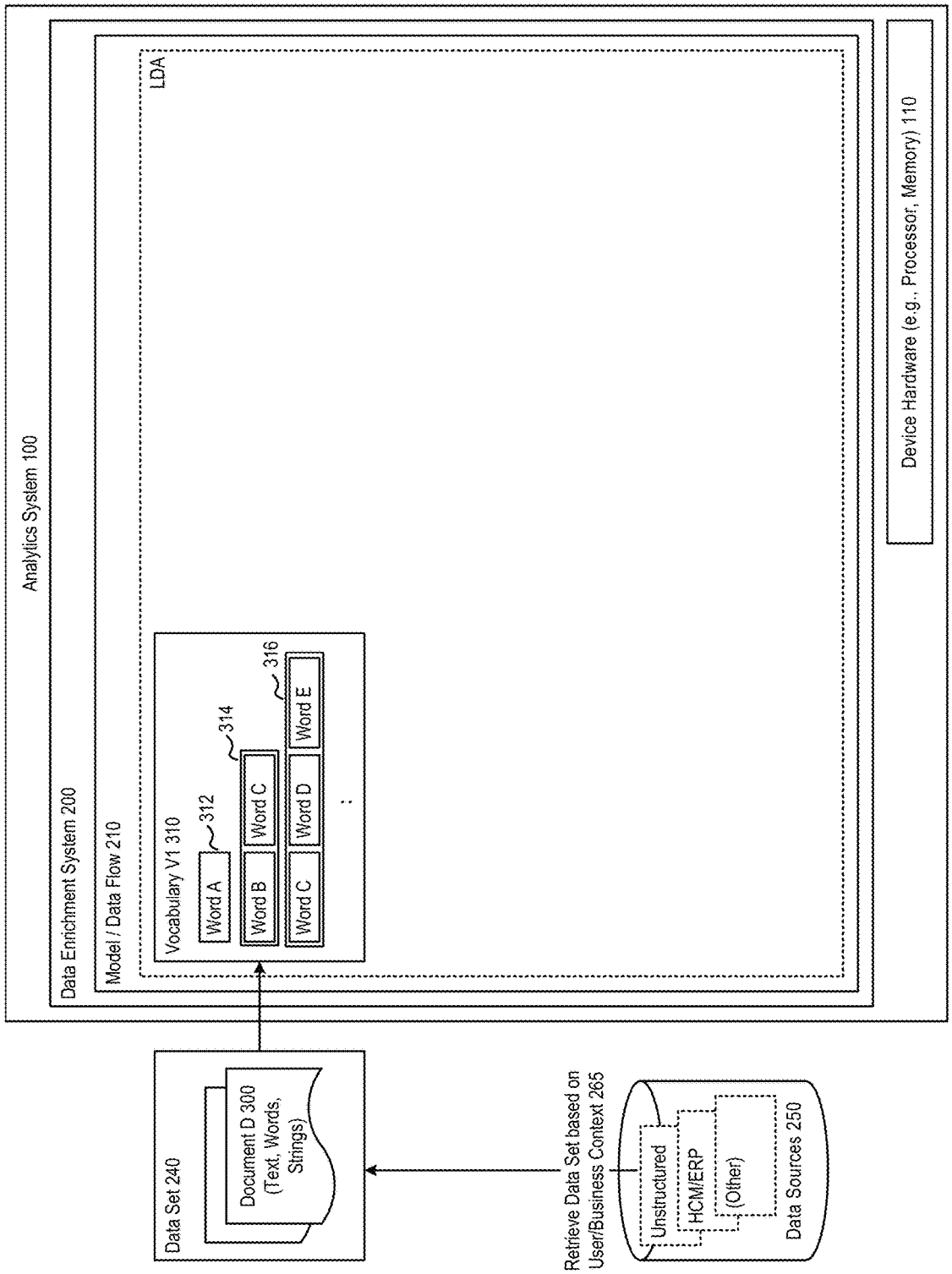
FIG. 4 further illustrates a system for use of text analytics to transform, analyze, or visualize data, in accordance with an embodiment.

As illustrated in FIG. 4, in accordance with an embodiment, the process performed by the system includes:

Receiving, as an input or as a data flow, a collection of documents D 300. Such documents can be received in the form of unstructured data, such as, for example, e-mails, text messages, responses to online surveys, or other types of free-form or unstructured text. By way of illustrative example, a typical document may include several long strings of text, of perhaps 40-3000 characters each.

Generating a vocabulary V1 (310) from the collection of documents D, to be used in LDA processing. To leverage information contained in word order, this vocabulary should comprise not only individual words 312, but also pairs of words (bigrams 314) and/or triples of words (trigrams 316), or phrases or sequences of greater length if such word sequences appear frequently enough in the collection of documents D.

In accordance with an embodiment, LDA processing can be accomplished, for example, using a SciKitLearn library class CountVectorizer, and specifying the ngram_range parameter as being ngram_range=(1,3), which directs the system such that unigrams, bigrams, and trigrams can all be considered as candidate vocabulary terms.

In such an embodiment, other CountVectorizer parameters can be set to prevent overfitting the learning model For example, the max_df parameter (maximum document frequency) can be set to something less than 1.0, such as 0.85, so that terms that appear in more than 85% of the documents are not considered distinctive enough for the vocabulary used by LDA. The max_features parameter (maximum size of the resultant vocabulary) can be set relatively low, such as 1000, so that the model does not overfit on spurious terms.

The description of various embodiments provided herein that utilize the SciKitLearn library for purposes of LDA processing are provided for purposes of illustration of an example LDA processing library. In accordance with other embodiments, the analytics system can utilize other types of LDA processing libraries, algorithms, processes, or functions.

Figure 5:
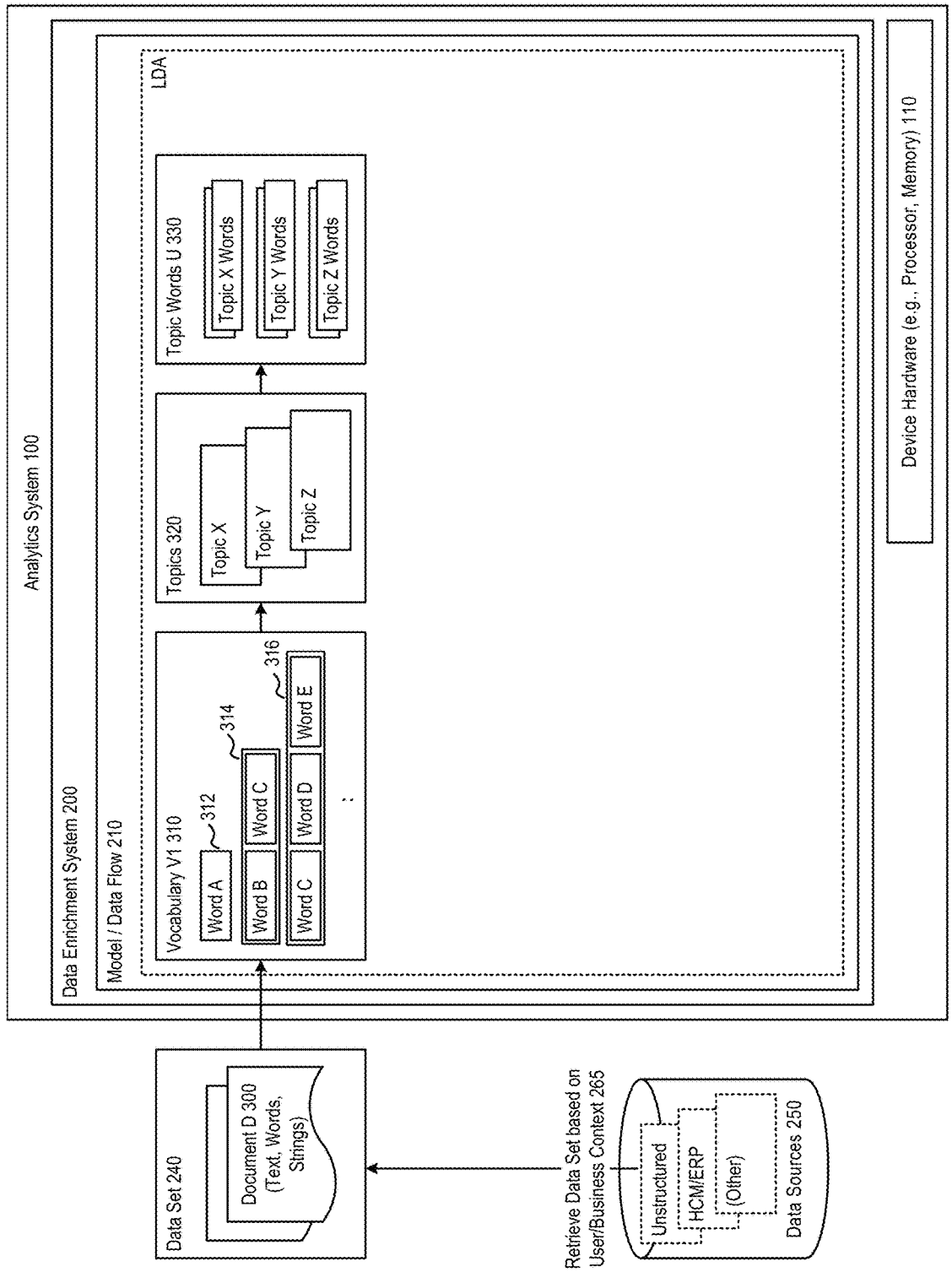
FIG. 5 further illustrates a system for use of text analytics to transform, analyze, or visualize data, in accordance with an embodiment.

As illustrated in FIG. 5, in accordance with an embodiment, the LDA process is executed by the system with vocabulary V1 on the collection of documents D, producing N topics 320. In accordance with various embodiments, the value for N can be either (a) hard-coded to something useful for a variety of use cases, such as N=6, (b) specified by the user, or (c) automatically determined by the system by attempting various values for N and measuring topic coherence.

Figure 6:
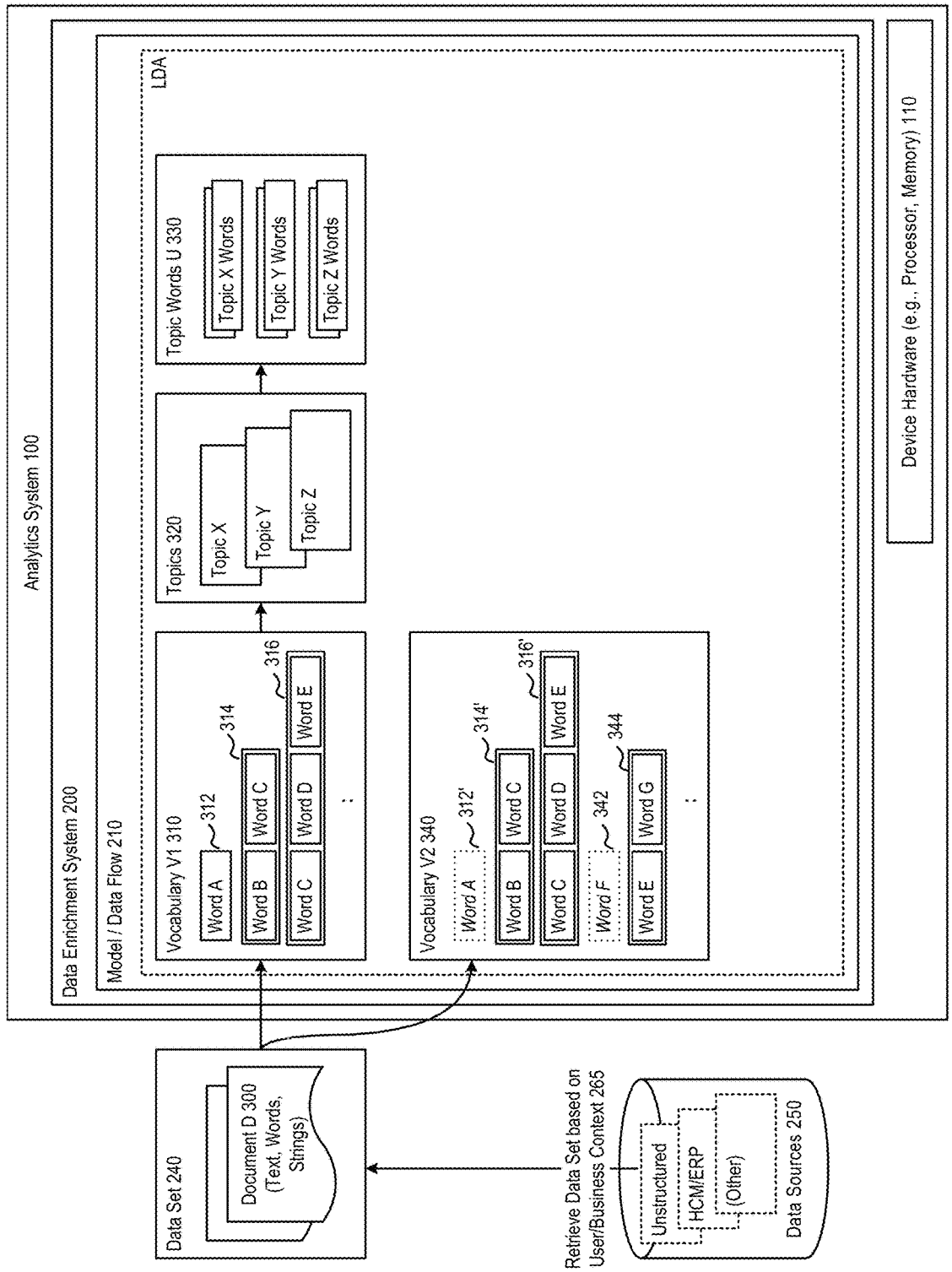
FIG. 6 further illustrates a system for use of text analytics to transform, analyze, or visualize data, in accordance with an embodiment.

As illustrated in FIG. 6, in accordance with an embodiment, a second vocabulary V2 (340) is generated by the system from the collection of documents D, that is much larger than vocabulary V1 (e.g., in this example by including 314, 316, and additionally 344).

In accordance with an embodiment, and as indicated above, LDA processing can be accomplished, for example, using a SciKitLearn library class CountVectorizer. In such an embodiment, in order to generate the second vocabulary, the parameters for max_df can be loosened (e.g. to 0.95 instead of 0.85), as can those for max_features (e.g. to 100,000 instead of 1000), and by also excluding single-word unigrams (e.g., in this example 312, 342) by setting ngram_range=(2,3). The LDA process keeps track of the probability of each vocabulary term appearing in each topic.

As described above, the use of the SciKitLearn library for purposes of LDA processing is provided for purposes of illustration; in accordance with other embodiments, the analytics system can utilize other types of LDA processing libraries, algorithms, processes, or functions.

Figure 7:
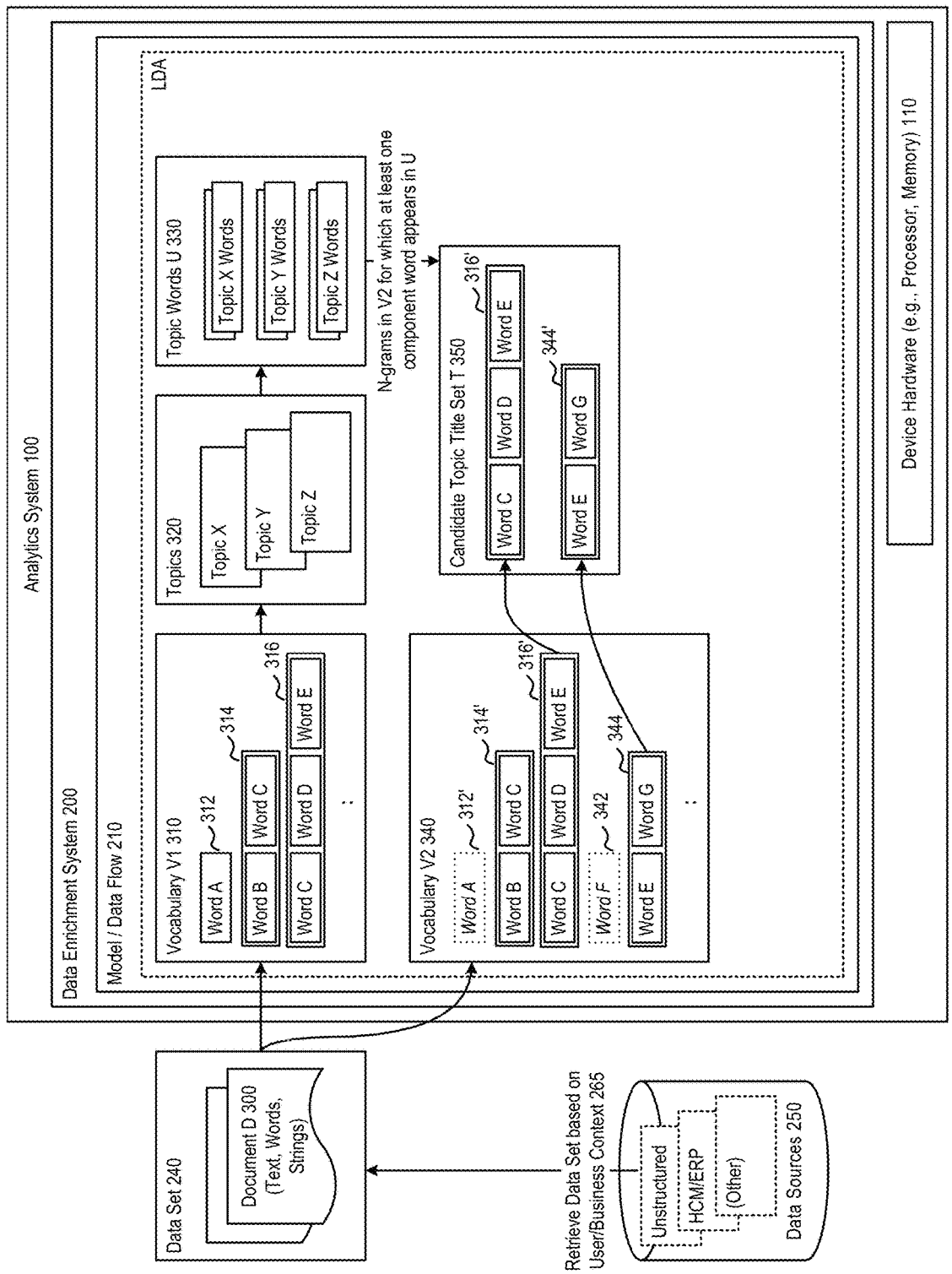
FIG. 7 further illustrates a system for use of text analytics to transform, analyze, or visualize data, in accordance with an embodiment.
Figure 8:
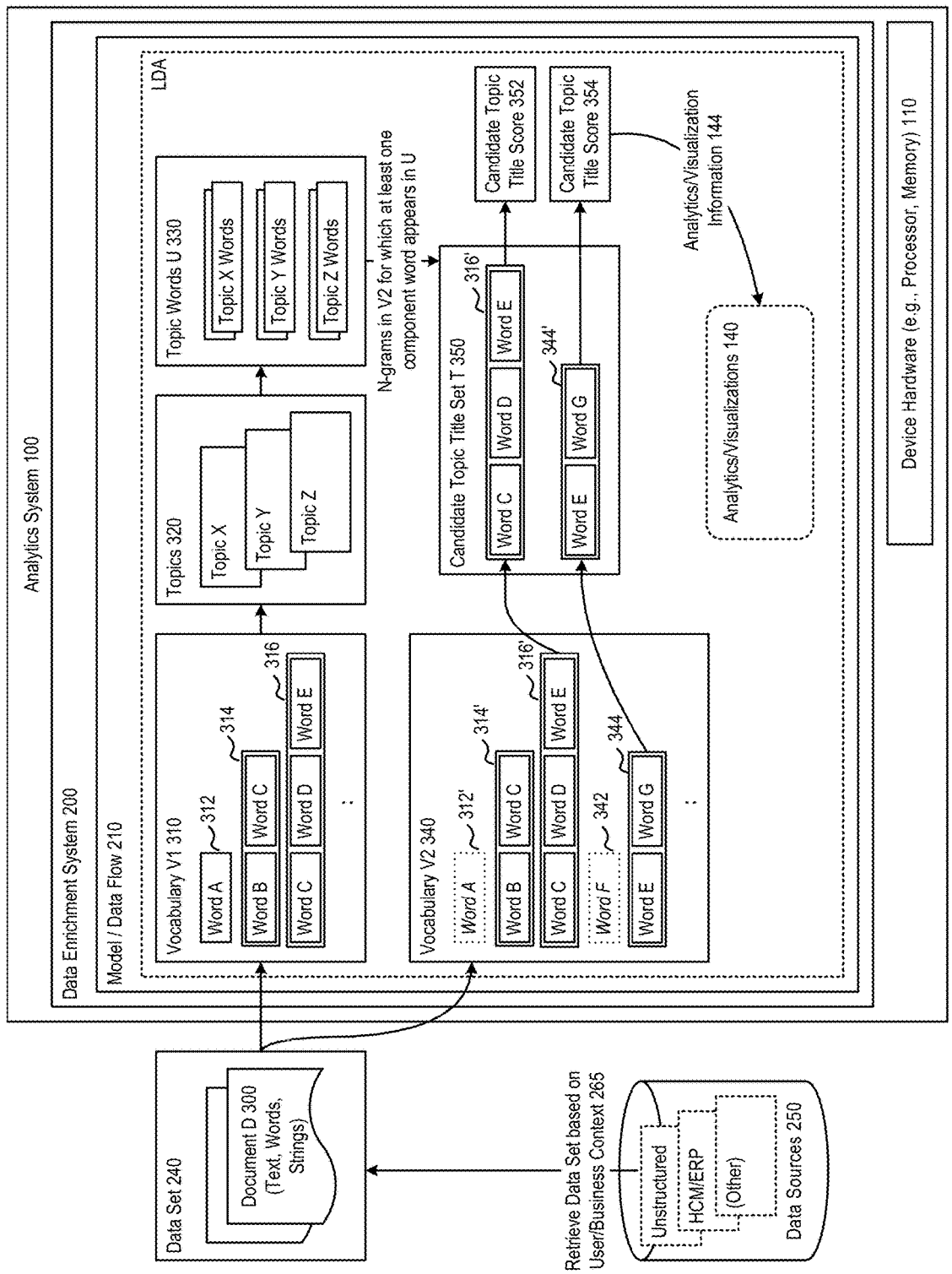
FIG. 8 further illustrates a system for use of text analytics to transform, analyze, or visualize data, in accordance with an embodiment.

In accordance with an embodiment, the system determines a union U 330 of the sets of top M words for each of the N topics (wherein a typical value for M is 50); and then for each topic i of the N topics, generates a topic title by:

As illustrated in FIG. 7, generating a candidate topic title set T 350 by selecting all multi-word topics or n-grams (e.g., bigrams or two-word topic titles, and trigrams or three-word topic titles) from vocabulary V2, for which at least one component word appears in the union U of the sets of top M words for each of the N topics; and As illustrated in FIG. 8, scoring each candidate topic title from T by:

Computing its LDA scores (treating the two-word or three-word title as if it were an entire document, and calculating the probability that the "document" is in each of the N topic). This produces a vector S of length N, a probability for each topic; and Calculating a candidate topic title score (352, 354), where $s_j$ is the jth element of S; and a is typically 3:

$$\text{score} = s_j - \sum_{k \neq i} \alpha s_k / (N-1)$$

In accordance with an embodiment, the system can then choose the top-scoring candidate topic title as a label or name for that topic.

Use of Sentiment Analysis

In accordance with various embodiments, the system can apply one or more algorithmic processes that perform term frequency-inverse document frequency (TF-IDF) based sentiment analysis, and/or an assessment of reading grade level as a machine learning feature, to control or supplement the application of text analytics to a particular data flow or set of input data.

Generally described, a TF-IDF algorithm or process can be used to provide a value or indication of how important a particular word may be to a particular document in a collection of documents. The TF-IDF value increases proportionally to the number of times the word appears in the document, offset by the number of documents in the collection of documents, which reflects the fact that some words may appear more frequently in general. Such algorithms or processes can be used to perform a sentiment analysis, or provide an indication of some subjective information associated with a particular document.

Generally, described, a reading (grade) level algorithm or process can be used to provide a value or indication of the reading level of a particular document or text. In accordance with an embodiment, the reading grade level may be calculated based on, for example, a number of sentences in the document; a total number of words; a number of syllables; the presence of unusual words or phrasing, or other characteristics indicative of a typical reading grade level.

Figure 9:
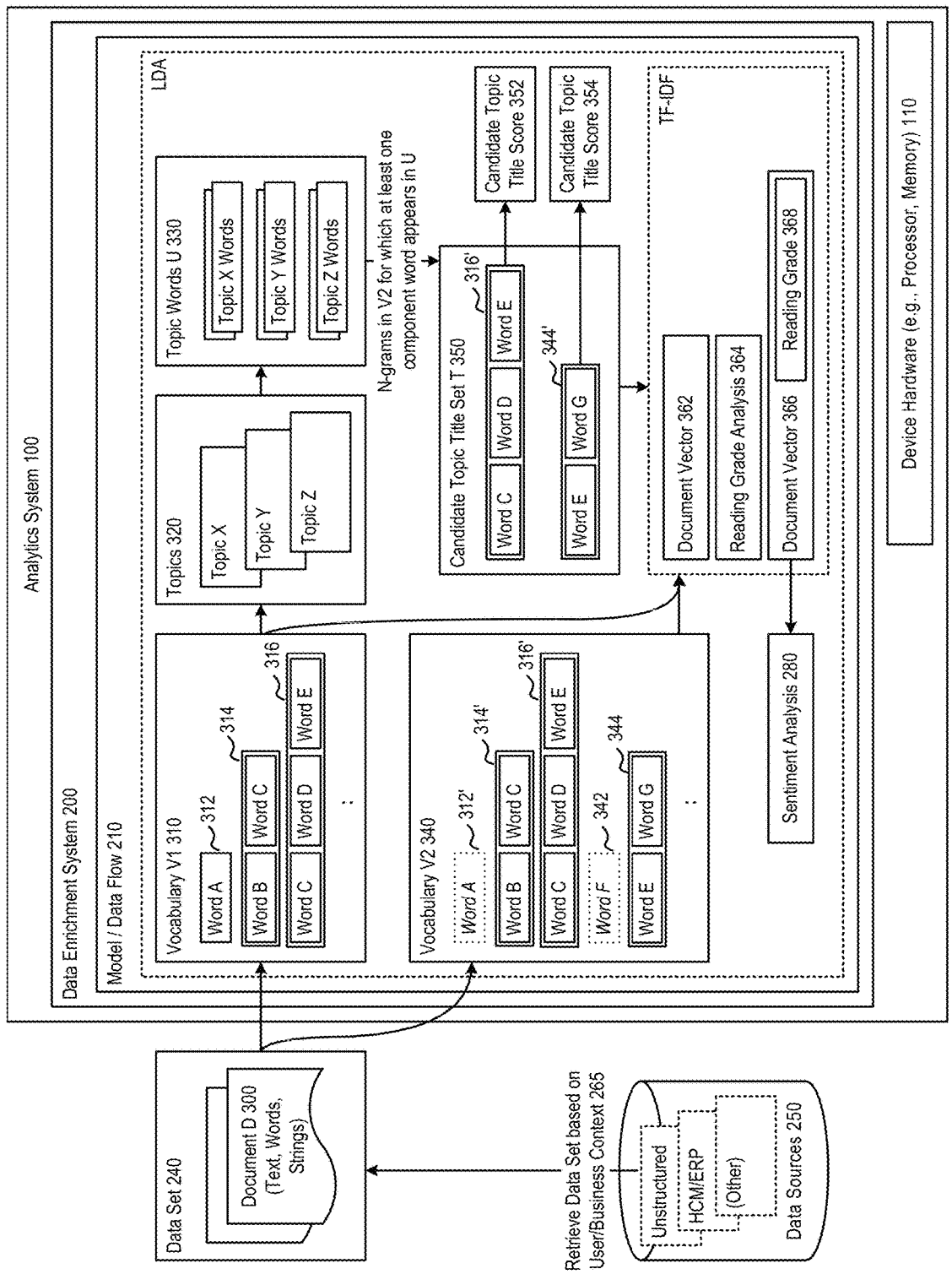
FIG. 9 further illustrates a system for use of text analytics to transform, analyze, or visualize data, in accordance with an embodiment.

FIG. 9 further illustrates a system for use of text analytics to transform, analyze, or visualize data, in accordance with an embodiment.

As illustrated in FIG. 9, in accordance with an embodiment, once a vocabulary associated with a collection of documents D is generated (e.g., by generating a vocabulary V1 and/or vocabulary V2 as described above), the system can apply a TF-IDF algorithm or process, together with logistic regression, to perform a sentiment analysis on a particular document.

In accordance with an embodiment, the TF-IDF process converts the document into a numeric document vector 362.

At the same time, the system can perform a reading grade analysis 362, which information is appended to the document vector, so that the final document vector 366 includes a reading grade level indication 368, for subsequent use in machine learning.

The incorporation of reading grade level indication within the document vector increases the resultant accuracy of the model in addressing particular use cases, such as for example wherein negative sentiment is correlated with a lower reading grade level.

Text Analytics Process

Figure 10:
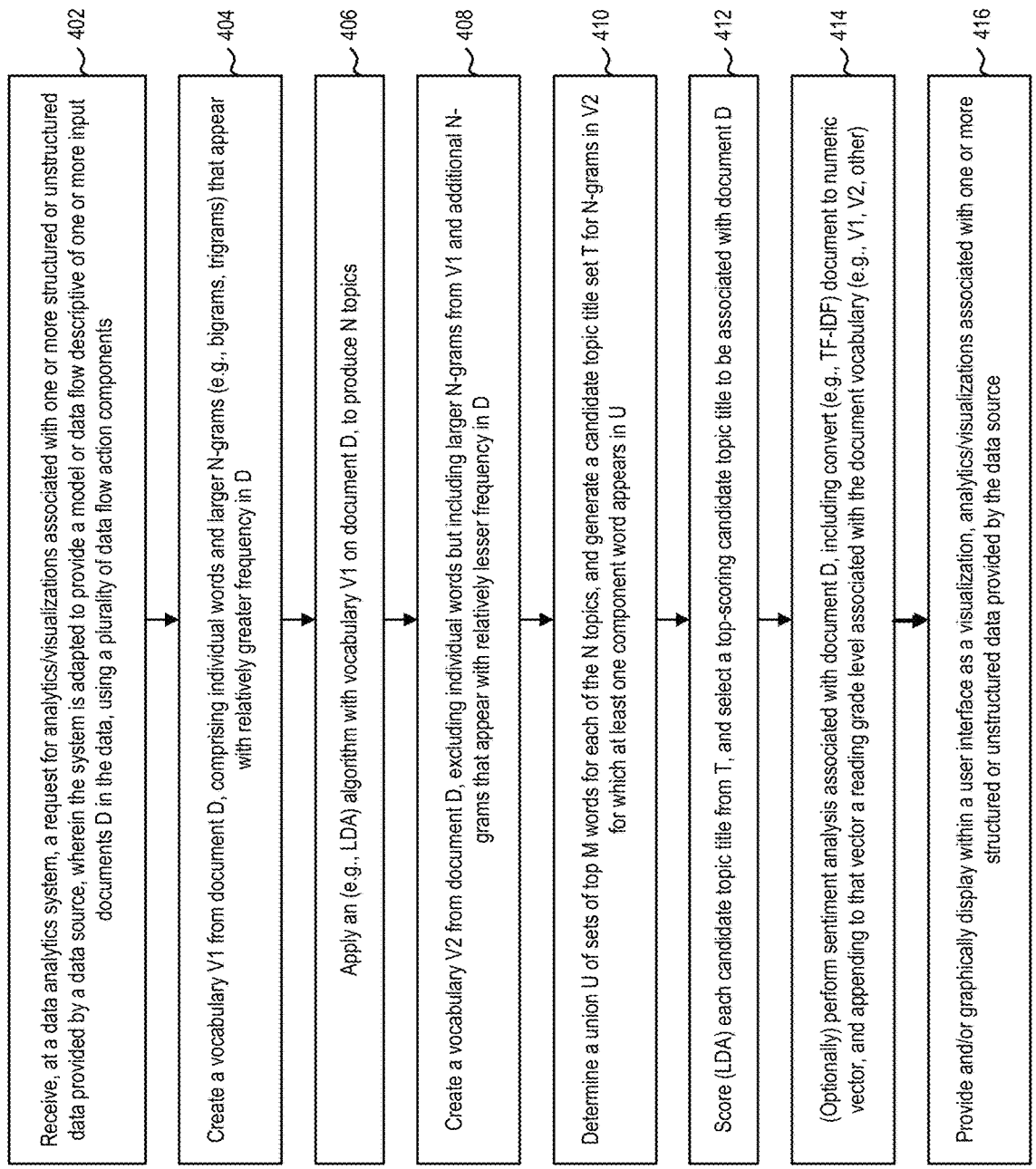
FIG. 10 illustrates a process for use of text analytics to transform, analyze, or visualize data, in accordance with an embodiment.
Figure 11:
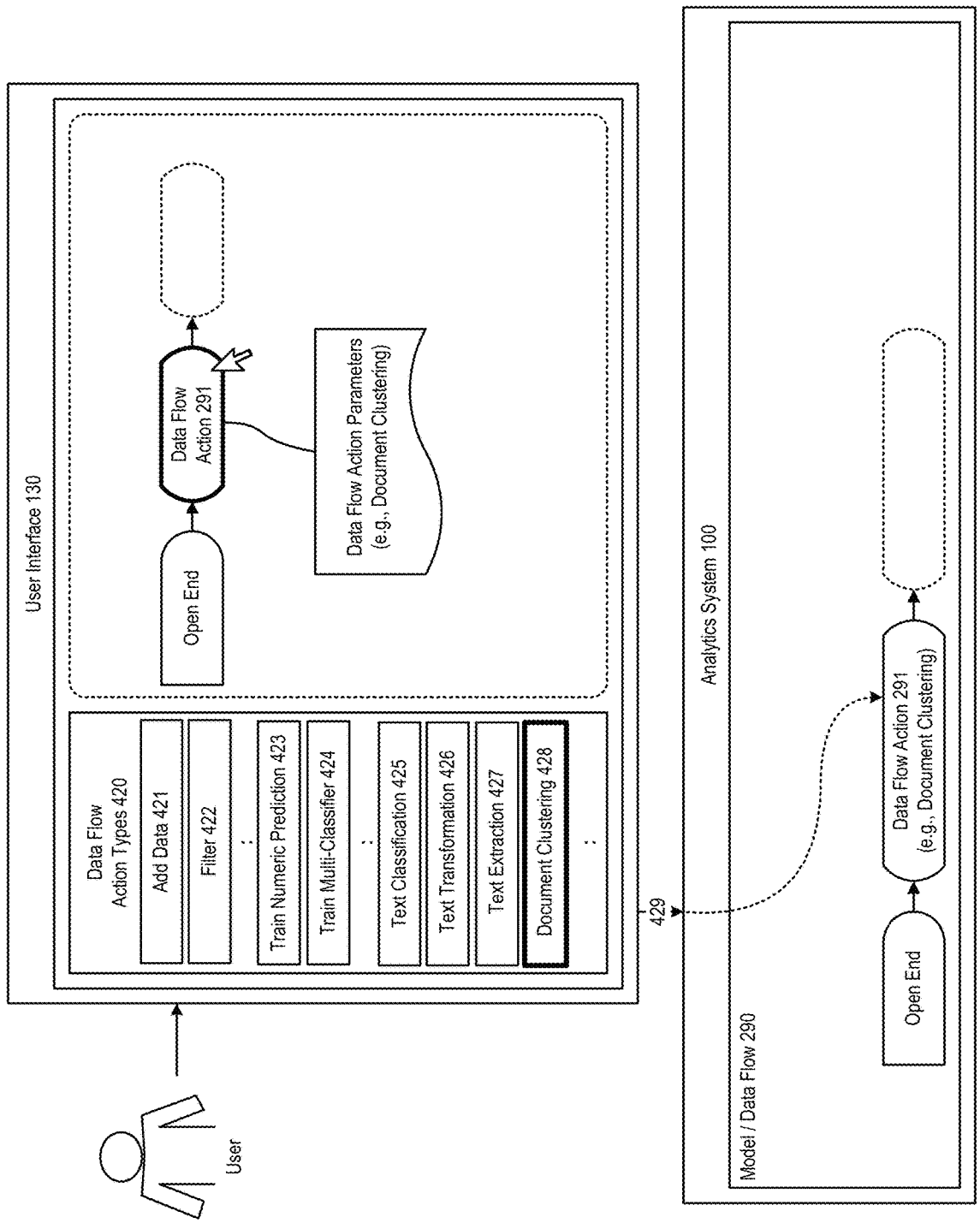
FIG. 11 illustrates the use of a user interface with the system, to provide self-service text analytics, in accordance with an embodiment.
Figure 12:
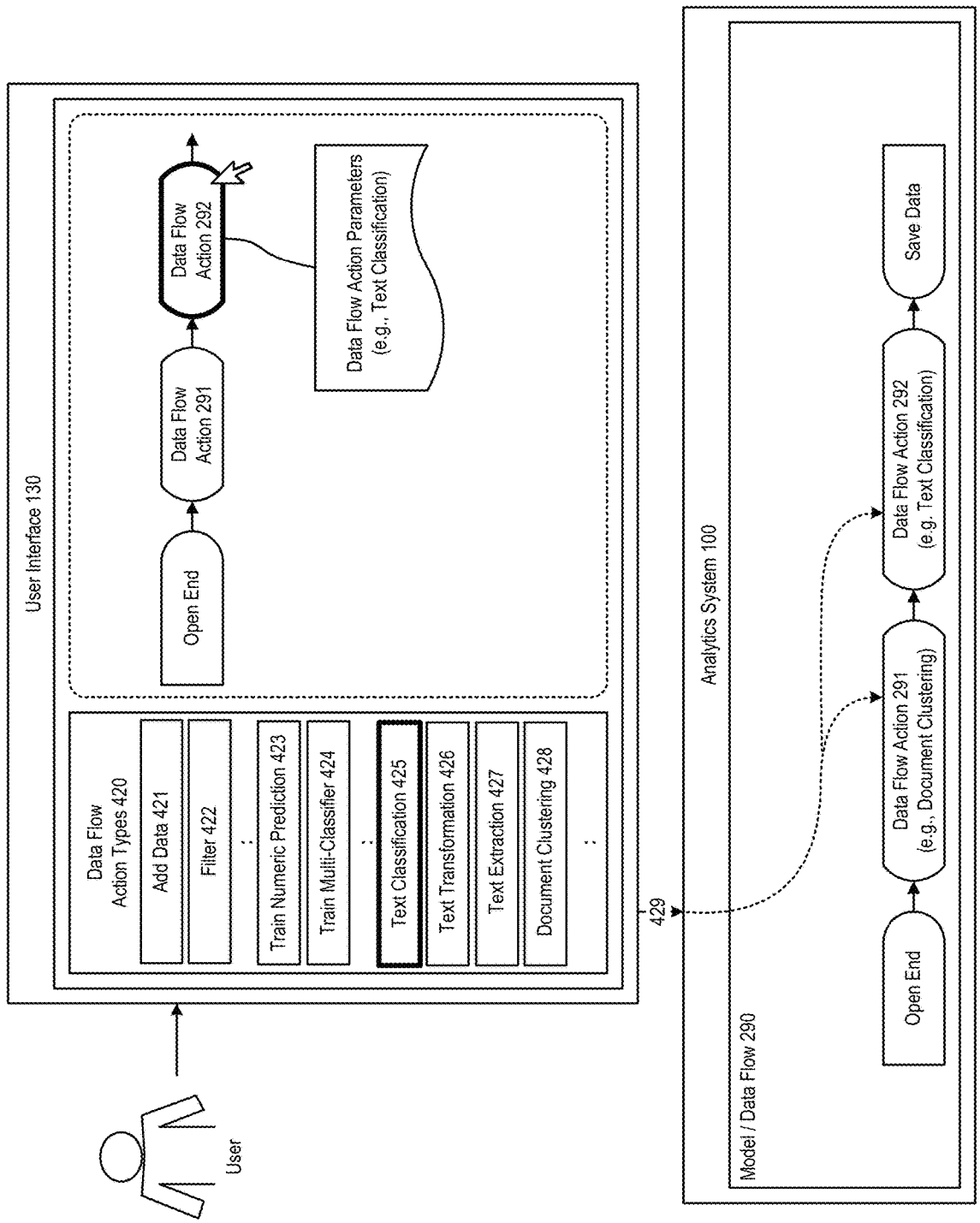
FIG. 12 illustrates the use of a user interface with the system, to provide self-service text analytics, in accordance with an embodiment.
Figure 13:
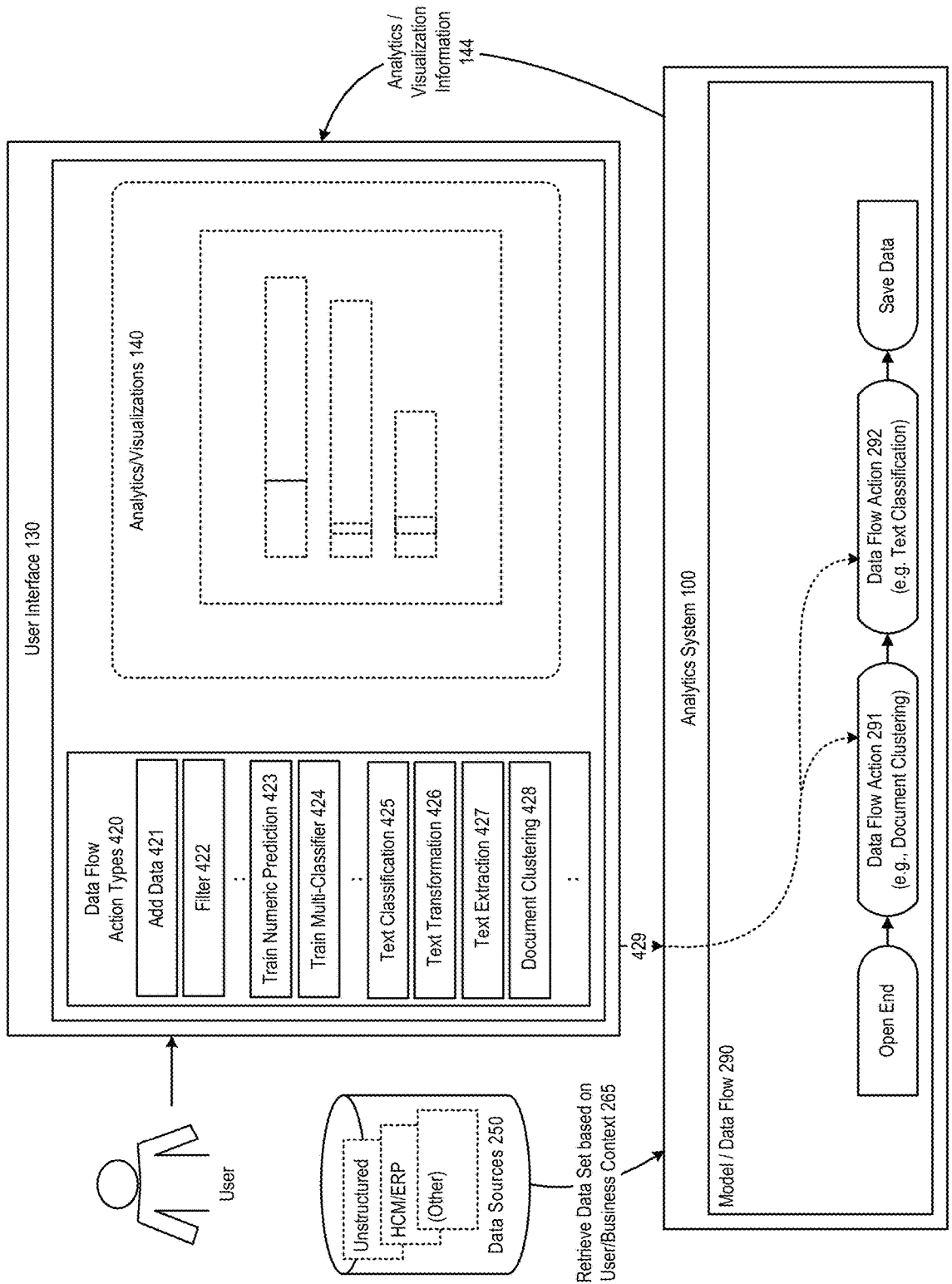
FIG. 13 illustrates the use of a user interface with the system, to provide self-service text analytics, in accordance with an embodiment.
Figure 14:
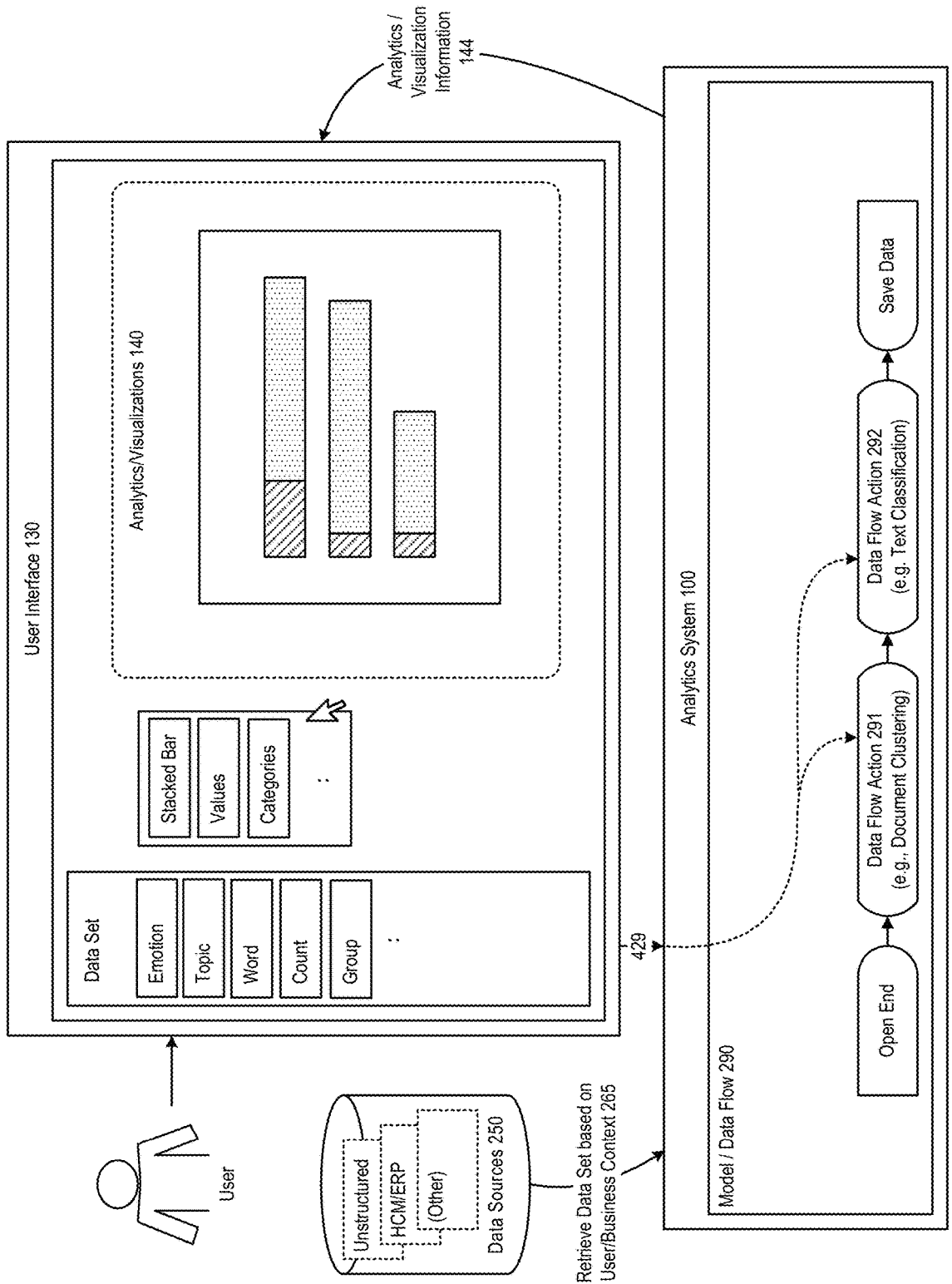
FIG. 14 illustrates the use of a user interface with the system, to provide self-service text analytics, in accordance with an embodiment.

FIG. 10 illustrates a process for use of text analytics to transform, analyze, or visualize data, in accordance with an embodiment.

As illustrated in FIG. 10, in accordance with an embodiment, at step 402, a data analytics system receives a request for analytics/visualizations associated with one or more structured or unstructured data provided by a data source, wherein the system is adapted to provide a model or data flow descriptive of one or more input documents D in the data, using a plurality of data flow action components.

At step 404, the system creates a vocabulary V1 from document D, comprising individual words and larger N-grams (e.g., bigrams, trigrams) that appear with relatively greater frequency in D.

At step 406, the system applies an (e.g., LDA) algorithm with vocabulary V1 on document D, to produce N topics.

At step 408, the system creates a vocabulary V2 from document D, excluding individual words but including larger N-grams from V1 and additional N-grams that appear with relatively lesser frequency in D.

At step 410, the system determines a union U of sets of top M words for each of the N topics, and generate a candidate topic title set T for N-grams in V2 for which at least one component word appears in U.

At step 412, the system scores (LDA) each candidate topic title from T, and selects a top-scoring candidate topic title to be associated with document D.

At step 414, the system can (optionally) perform sentiment analysis associated with document D, including converting (e.g., TF-IDF) the document to a numeric vector, and appending to that vector a reading grade level associated with the document vocabulary (e.g., V1, V2, other).

At step 416, the system provides and/or graphically displays within a user interface as a visualization, analytics/visualizations associated with one or more structured or unstructured data provided by the data source.

User Interface for Self-Service Analytics

As described at the outset, the typical approach to using text analytics with such data necessitates the user to be particularly adept in applying techniques such as computer-based natural language processing, which in turn hinders accessibility by business or everyday users to such features.

In accordance with an embodiment, the system can be implemented within a cloud environment that enables self-service text analytics, wherein for example an organizational business user who may not be expert in the use of machine learning as applied to data processing, can interact with the system via a user interface, to apply natural language processing or other text analysis techniques to a data flow or set of input data, to generate visualizations or other types of useful information associated with the data.

FIGS. 11-14 illustrate the use of a user interface with the system, to provide self-service text analytics, in accordance with an embodiment.

As illustrated in FIGS. 11-14, in accordance with an embodiment, the user interface provides access to data flow action types 420, that enable the user to specify, for example, one or more of add data 421, filter 422, train numeric prediction, 423, train multi-classifier 424, text classification 425, text transformation 426, text extraction 427, document clustering 428, or other types of data flow actions, that operate 429 on a particular data flow or set of input data, including data flows of unstructured text or other types of textual data input.

In accordance with an embodiment, the user interface organizes a variety of machine learning, natural language processing, or other text analysis techniques into readily accessible data flow action types, such as, for example:

Text Classification: for example, Sentiment; Reading grade level; Engagement Level; Novelty; Humor; Sarcasm; Stance/Rumor; Language Detection; Neologism classification; Outlier Score.

Text Transformation: for example, Prep; Correction; Language translation; Summarization; Vectorization for Machine Learning; TF-IDF; Word2Vec; Doc2Vec.

Text Extraction: for example, Named-entity recognition; Parts-of-Speech Tagging; Co-reference Resolution; Word Count.

Document Clustering: for example, LDA.

The above examples are provided by way of example and for purposes of illustration; in accordance with various embodiments, the user interface can provide access to other types of data flow actions associated with other natural language processing techniques.

In accordance with an embodiment, the user interface allows a user to specify one or more data flow action types for use with a data set, or otherwise interact with the user interface to transform, analyze, or visualize the data, for example to generate graphs, charts, or other types of data analytics or visualizations.

In accordance with an embodiment, the user interface allows a user to combine pairs of operations into single operations. For example, Stop Word Removal and Lemmatization operations can be combined into an action called "Prep" (with configuration options the user can control independently); similarly Combining Word Count and Group By operations can be combined into a single operation.

In accordance with an embodiment, when used with other data flow environments, e.g. Oracle Cloud Infrastructure Data Flow, the user interface can leverage generic, e.g., Data Flow blocks that perform machine learning so that the inclusion of text analytics is treated within the user interface as other forms of data flow operations. The benefits of this approach include a reduced number of action blocks needed on the, e.g., Data Flow tool palette; and also provide an indication to the end user that text analytics can be considered alongside numerical data processing for use in machine learning.

Example Use Cases

FIGS. 15-19 illustrate various examples of uses in which the system and user interface can be used to provide self-service text analytics, for example, in business, science and engineering, media communications, ecommerce, or online search applications.

Figure 15:
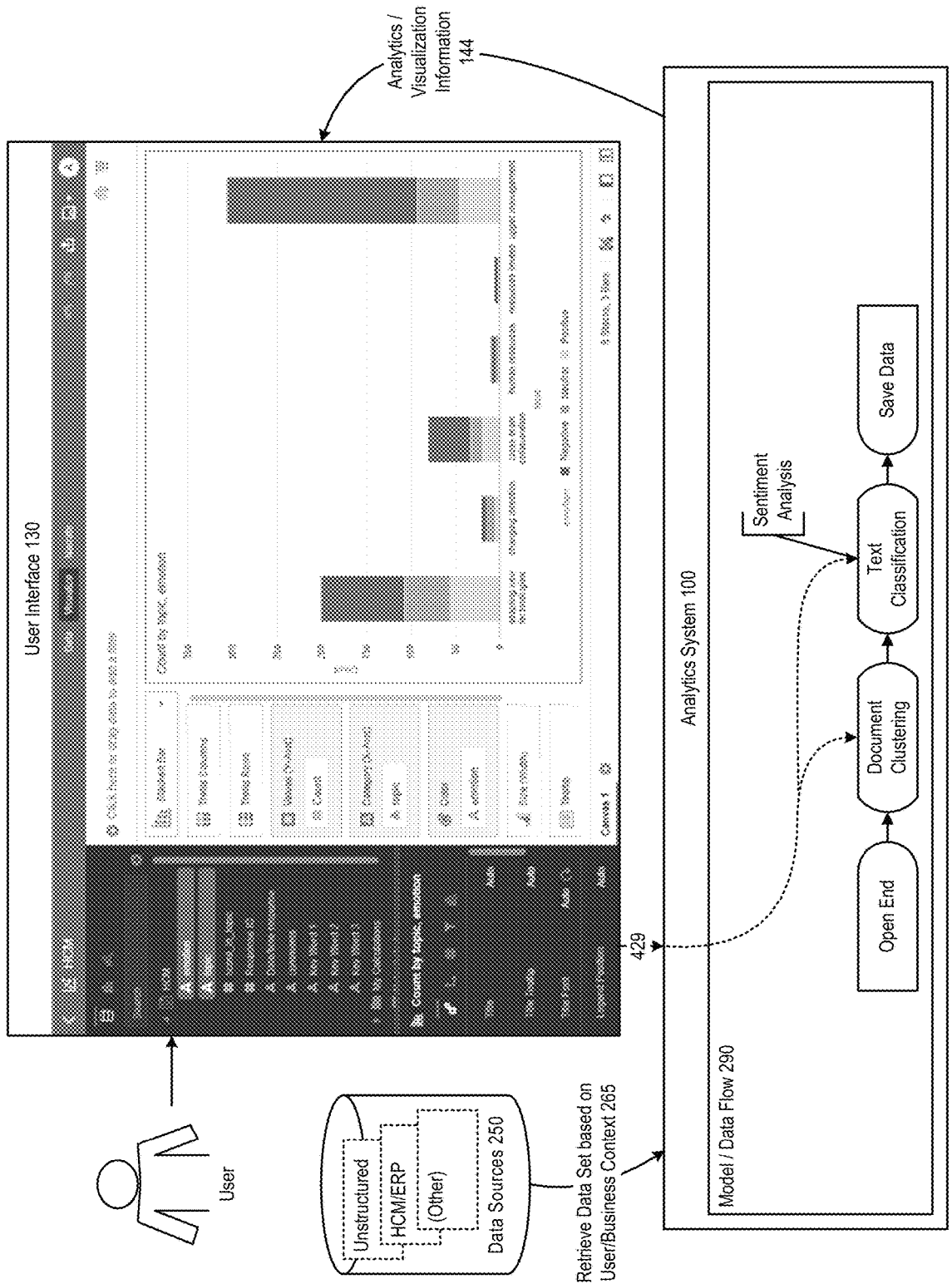
FIG. 15 illustrates an example use of a user interface to provide self-service text analytics, in accordance with an embodiment.

As illustrated in FIG. 15, in accordance with an embodiment and an example HCM use case, the user can use the system and user interface to configure the model or data flow to include, in this example, one or more document clustering and text classification (sentiment analysis) data flow actions.

When the data is processed, the system can perform one or more LDA clustering, TF-IDF based sentiment analysis, and/or an assessment of reading grade level as a machine learning feature, to control or supplement the application of text analytics to the data, as described above.

Figure 16:
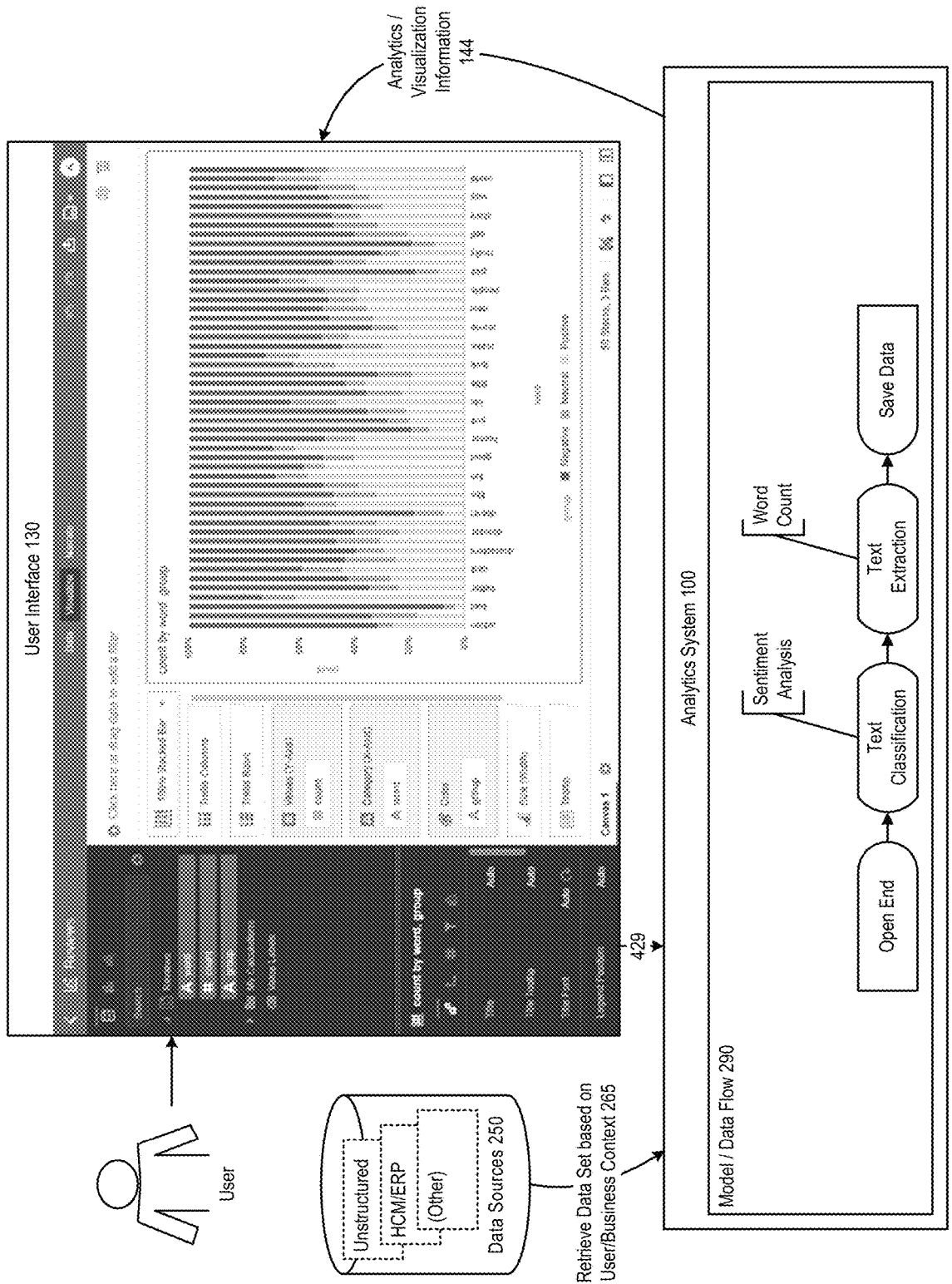
FIG. 16 illustrates another example use of a user interface to provide self-service text analytics, in accordance with an embodiment.

As illustrated in FIG. 16, in accordance with an embodiment, the user can use the system and user interface to modify the model or data flow to include, in this example, one or text classification (sentiment analysis) and text extraction (word count) data flow actions.

Figure 17:
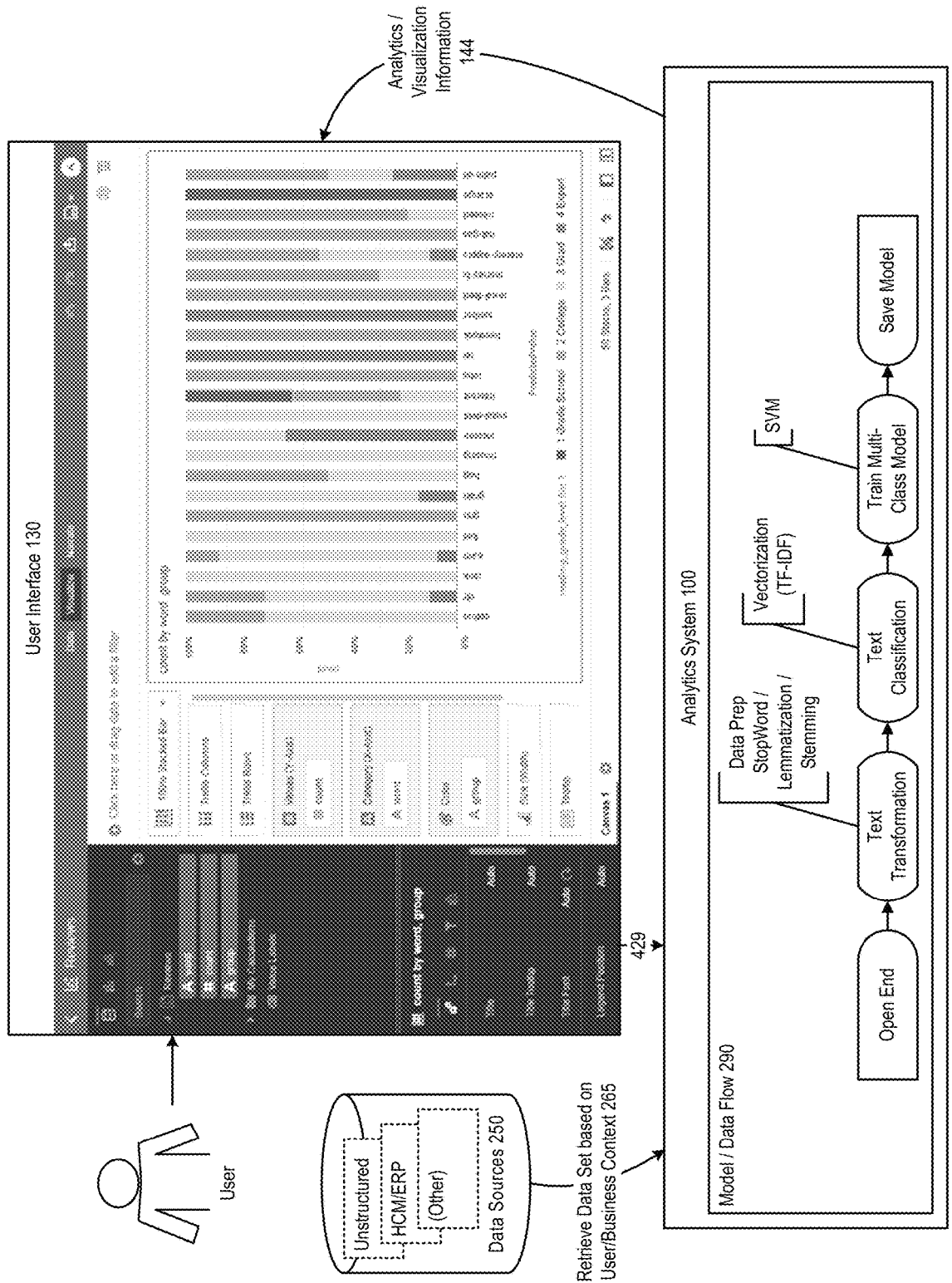
FIG. 17 illustrates another example use of a user interface to provide self-service text analytics, in accordance with an embodiment.

As illustrated in FIG. 17, in accordance with an embodiment, the user can interact with the user interface to modify the model or data flow to include, in this example, one or more text transformations (data prepare), and text classification TF-IDF operations, and train a multi-class model, in this example using a support vector machine (SVM) for classification and regression. When provided in association with environments, such as for example OAC, that provide a user interface that allows user control over the training of machine learning models via, e.g., Data Flow ML blocks, the system can utilize such Data Flow ML blocks to reduce the number of options presented within a user palette (e.g., NLP-specific Data Flow blocks need not be provided on the palette to train a custom ML model). This approach can help reduce user training time.

Figure 18:
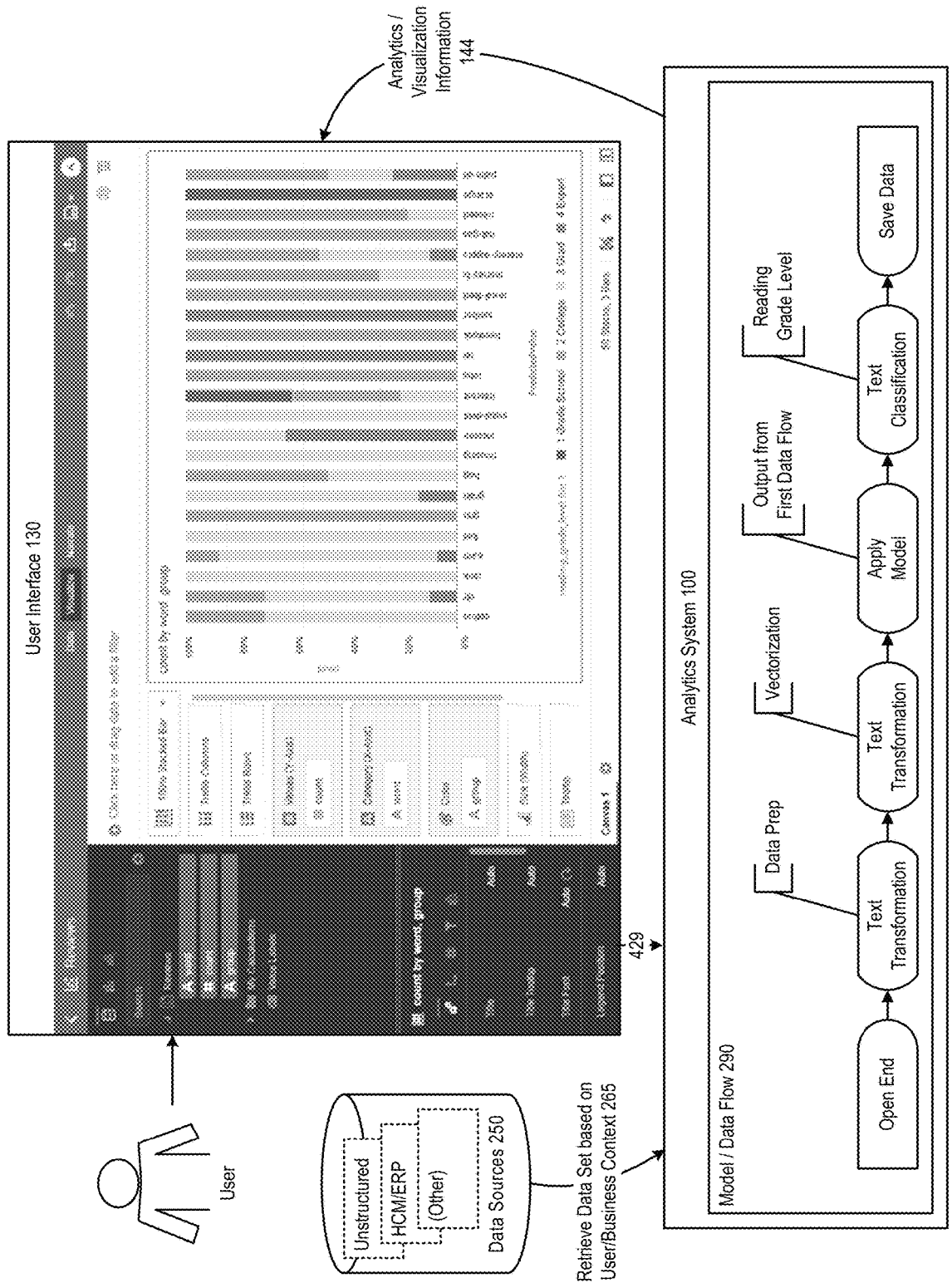
FIG. 18 illustrates another example use of a user interface to provide self-service text analytics, in accordance with an embodiment.

As illustrated in FIG. 18, continuing the example from above, in accordance with an embodiment, the system can apply the model created during the data flow above, and include an assessment of reading grade level, to transform, analyze, and visualize a data flow, including for example an unstructured text or other type of textual data input.

In accordance with various embodiments, the described approach can be used, for example to detect positive/negative sentiment within a particular document, detect hate speech, or provide a quick assessment of, for example, free-form HR survey results, or employee performance reviews. The approach can be similar applied to other types of unstructured data, for example, an assessment of online news articles, or other media content.

Self-Service Analytics Process

Figure 19:
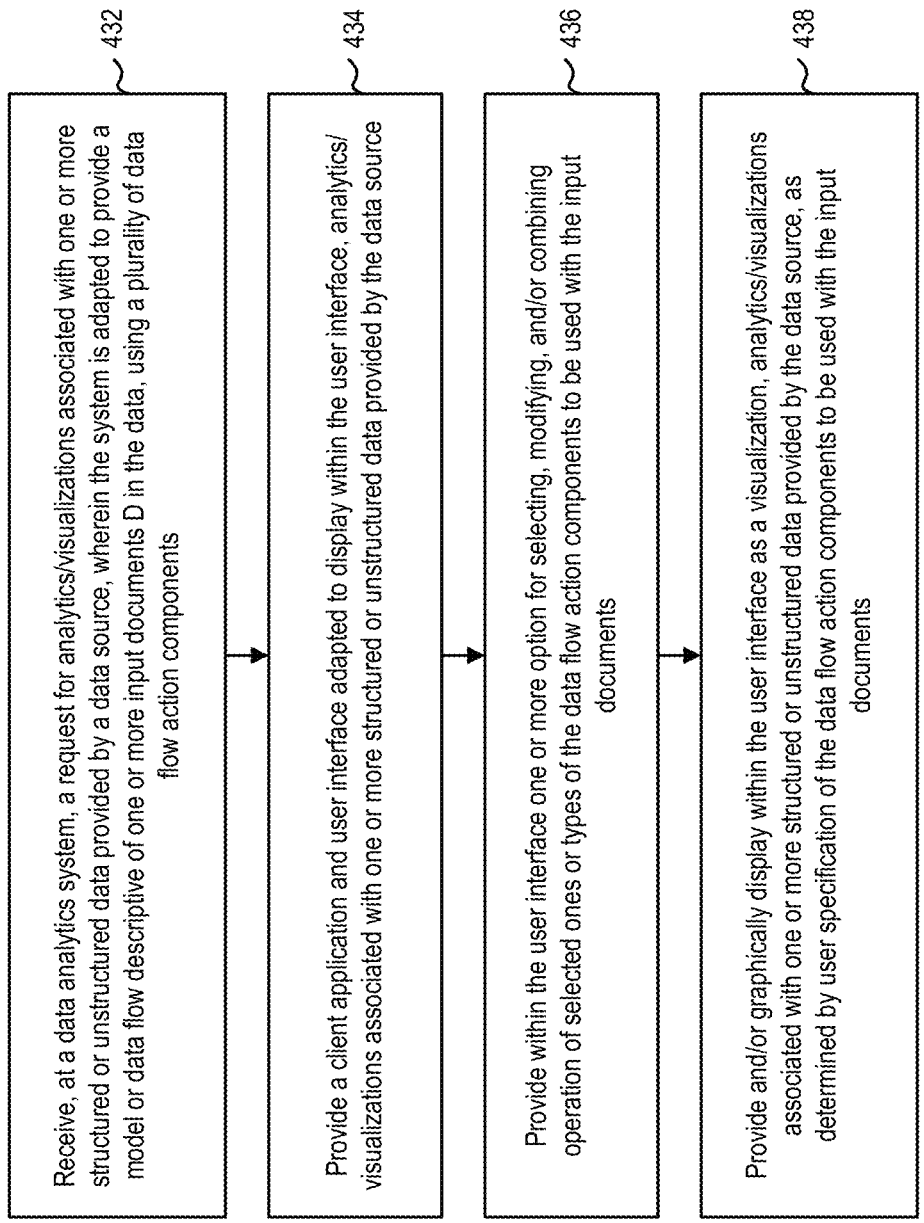
FIG. 19 illustrates a process for use of a user interface, to provide self-service text analytics, in accordance with an embodiment.

FIG. 19 illustrates a process for use of a user interface, to provide self-service text analytics, in accordance with an embodiment.

In accordance with an embodiment, at step 432, the system receives, at a data analytics system, a request for analytics/visualizations associated with one or more structured or unstructured data provided by a data source, wherein the system is adapted to provide a model or data flow descriptive of one or more input documents D in the data, using a plurality of data flow action components.

At step 434, a client application and user interface are adapted to display within the user interface, analytics/visualizations associated with one or more structured or unstructured data provided by the data source.

At step 436, within the user interface are provided one or more options for selecting, modifying, and/or combining operation of selected ones or types of the data flow action components to be used with the input documents.

At step 438, within the user interface are provided one or more options for selecting, modifying, and/or combining operation of selected ones or types of the data flow action components to be used with the input documents.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use of text analytics to transform, analyze, and visualize data, including support for data flows of unstructured text or other types of textual data input, comprising:

a data analytics system including a processor, memory, and data enrichment system that enables access by client devices/applications to access and transform, analyze, or visualize data;

wherein the system is adapted to perform one or more clustering or sentiment analysis processes, to determine candidate topic titles to be associated with a particular data flow or set of input data, to control or supplement the application of text analytics to the data, including:

receiving a set of input data as a collection of documents;

generating a first vocabulary associated with the collection of documents and comprising an amount of multi-word combinations of words that appear with frequency in the collection of documents;

processing the first vocabulary associated with the collection of documents, to produce a plurality of topics;

generating a second vocabulary associated with the collection of documents and comprising a larger amount of multi-word combinations of words;

generating a candidate topic title set by selecting from the second vocabulary those multi-word combinations for which at least one component word appears in a union of top component words for each of the candidate topics;

scoring each candidate topic title by calculating a probability that a document is associated with that candidate topic title; and returning one or more top-scoring candidate topic titles as a label or name for use with the document as part of a data flow.

2. The system of claim 1, wherein the clustering or sentiment analysis processes includes a Latent Dirichlet Allocation (LDA) process to:
  determine a vocabulary associated with a collection of documents within the particular data flow or set of input data,
  generate a plurality of topics associated with the documents, compute LDA scores for two-word or three-word topic titles for the particular data flow or set of input data, and
  select a top-scoring candidate topic title as a label or name for that topic.

3. The system of claim 1, further comprising performing a term frequency-inverse document frequency (TF-IDF) based sentiment analysis, and/or an assessment of reading grade level, on one or more documents within the particular data flow or set of input data, wherein an indication of the reading grade level is incorporated within a document vector descriptive of the one or more documents.

4. The system of claim 1, wherein the system is implemented within a cloud environment that enables self-service text analytics and includes a user interface that enables a user to interact with the system to apply natural language processing or other text analysis techniques to a data flow or set of input data, to generate visualizations or other types of useful information associated with the data.

5. The system of claim 4, wherein the user interface provides access to data flow action types, that enable the user to specify one or more or more text classification, text transformation, text extraction, document clustering, or other types of data flow actions that operate on a particular data flow or set of input data, including data flows of unstructured text or other types of textual data input.

6. The system of claim 1, wherein a client application is implemented as software or computer-readable program code executable by a computer system or processing device, and having a user interface;
  wherein the client application operates to retrieve or access data at the data analytics system;
  wherein the user interface can include or provide access to data flow action types that enable self-service text analytics, including allowing a user to display a data set, or interact with the user interface to transform, analyze, or visualize the data, to generate graphs, charts, or other types of data analytics or visualizations of data flows associated therewith.

7. The system of claim 6, wherein a request for data analytics or visualization information is received via the client application and user interface and communicated to the data analytics system, wherein the system creates a user/business context associated with the request, and retrieves an appropriate data set to address the user/business context, for use in generating and returning requested data analytics or visualization information to the client.

8. The system of claim 1, wherein the system creates a model or data flow that reflects an understanding of the data flow or set of input data, by applying one or more natural language processing or other text analysis techniques to the data flow or set of input data, to generate visualizations or other types of useful information associated with the data.

9. A method for use of text analytics to transform, analyze, and visualize data, including support for data flows of unstructured text or other types of textual data input, comprising:
  providing a data analytics system including a processor, memory, and data enrichment system that enables access by client devices/applications to access and transform, analyze, or visualize data; and
  performing one or more clustering or sentiment analysis processes, to determine candidate topic titles to be associated with a particular data flow or set of input data, for use in controlling or supplementing the application of text analytics to the data, including:
    receiving a set of input data as a collection of documents;
    generating a first vocabulary associated with the collection of documents and comprising an amount of multi-word combinations of words that appear with frequency in the collection of documents;
    processing the first vocabulary associated with the collection of documents, to produce a plurality of topics;
    generating a second vocabulary associated with the collection of documents and comprising a larger amount of multi-word combinations of words;
    generating a candidate topic title set by selecting from the second vocabulary those multi-word combinations for which at least one component word appears in a union of top component words for each of the candidate topics;
    scoring each candidate topic title by calculating a probability that a document is associated with that candidate topic title; and
    returning one or more top-scoring candidate topic titles as a label or name for use with the document as part of a data flow.

10. The method of claim 9, wherein the clustering or sentiment analysis processes includes a Latent Dirichlet Allocation (LDA) process to:
  determine a vocabulary associated with a collection of documents within the particular data flow or set of input data,
  generate a plurality of topics associated with the documents, compute LDA scores for two-word or three-word topic titles for the particular data flow or set of input data, and
  select a top-scoring candidate topic title as a label or name for that topic.

11. The method of claim 9, further comprising performing a term frequency-inverse document frequency (TF-IDF) based sentiment analysis, and/or an assessment of reading grade level, on one or more documents within the particular data flow or set of input data, wherein an indication of the reading grade level is incorporated within a document vector descriptive of the one or more documents.

12. The method of claim 9, further comprising providing within a cloud environment that enables self-service text analytics, a user interface that enables a user to interact with the system to apply natural language processing or other text analysis techniques to a data flow or set of input data, to generate visualizations or other types of useful information associated with the data.

13. The method of claim 12, wherein the user interface provides access to data flow action types, that enable the user to specify one or more or more text classification, text transformation, text extraction, document clustering, or other types of data flow actions that operate on a particular data flow or set of input data, including data flows of unstructured text or other types of textual data input.

14. The method of claim 9, wherein a client application is implemented as software or computer-readable program code executable by a computer system or processing device, and having a user interface;

wherein the client application operates to retrieve or access data at the data analytics system;

wherein the user interface can include or provide access to data flow action types that enable self-service text analytics, including allowing a user to display a data set, or interact with the user interface to transform, analyze, or visualize the data, to generate graphs, charts, or other types of data analytics or visualizations of data flows associated therewith.

15. The method of claim 9, wherein the system creates a model or data flow that reflects an understanding of the data flow or set of input data, by applying one or more natural language processing or other text analysis techniques to the data flow or set of input data, to generate visualizations or other types of useful information associated with the data.

16. A non-transitory computer readable storage medium having instructions thereon, which when read and executed by a computer including one or more processors cause the computer to perform a method comprising:

providing, by a data analytics system, access by client devices/applications to access and transform, analyze, or visualize data; and performing one or more clustering or sentiment analysis processes, to determine candidate topic titles to be associated with a particular data flow or set of input data, for use in controlling or supplementing the application of text analytics to the data, including:

receiving a set of input data as a collection of documents;

generating a first vocabulary associated with the collection of documents and comprising an amount of multi-word combinations of words that appear with frequency in the collection of documents;

processing the first vocabulary associated with the collection of documents, to produce a plurality of topics;

generating a second vocabulary associated with the collection of documents and comprising a larger amount of multi-word combinations of words;

generating a candidate topic title set by selecting from the second vocabulary those multi-word combinations for which at least one component word appears in a union of top component words for each of the candidate topics;

scoring each candidate topic title by calculating a probability that a document is associated with that candidate topic title; and returning one or more top-scoring candidate topic titles as a label or name for use with the document as part of a data flow.

17. The non-transitory computer readable storage medium of claim 16, wherein the clustering or sentiment analysis processes includes a Latent Dirichlet Allocation (LDA) process to:

determine a vocabulary associated with a collection of documents within the particular data flow or set of input data, generate a plurality of topics associated with the documents, compute LDA scores for two-word or three-word topic titles for the particular data flow or set of input data, and select a top-scoring candidate topic title as a label or name for that topic.

18. The non-transitory computer readable storage medium of claim 16, further comprising performing a term frequency-inverse document frequency (TF-IDF) based sentiment analysis, and/or an assessment of reading grade level, on one or more documents within the particular data flow or set of input data, wherein an indication of the reading grade level is incorporated within a document vector descriptive of the one or more documents.

19. The non-transitory computer readable storage medium of claim 16, further comprising providing within a cloud environment that enables self-service text analytics, a user interface that enables a user to interact with the system to apply natural language processing or other text analysis techniques to a data flow or set of input data, to generate visualizations or other types of useful information associated with the data.

20. The non-transitory computer readable storage medium of claim 19, wherein the user interface provides access to data flow action types, that enable the user to specify one or more or more text classification, text transformation, text extraction, document clustering, or other types of data flow actions that operate on a particular data flow or set of input data, including data flows of unstructured text or other types of textual data input.

\* \* \* \* \*

UNITED STATES PATENT AND TRADEMARK OFFICE
CERTIFICATE OF CORRECTION

PATENT NO. : 12,159,106 B2
APPLICATION NO. : 17/408226
DATED : December 3, 2024
INVENTOR(S) : Malak et al.

It is certified that error appears in the above-identified patent and that said Letters Patent is hereby corrected as shown below:

On the Title Page

Column 1, under Item (73) assignee, Line 2, delete "CORPORATION" and insert
-- CORPORATION, Redwood Shores, CA (US) --, therefor.

In the Specification

In Column 3, Line 8, delete "features" and insert -- features. --, therefor.

In Column 4, Line 1, delete "ore" and insert -- or --, therefor.

In Column 5, Line 61, delete "ore" and insert -- or --, therefor.

In Column 8, Line 20, delete "s;" and insert -- $s_j$ --, therefor.

In Column 8, Line 20, delete "a" and insert -- $\alpha$ --, therefor.

Signed and Sealed this
First Day of April, 2025

Coke Morgan Stewart
*Acting Director of the United States Patent and Trademark Office*